United States Patent
Wadhwa et al.

(10) Patent No.: US 10,949,932 B2
(45) Date of Patent: Mar. 16, 2021

(54) SMART ANCHORING OF VISUAL TREATMENTS CORRESPONDING TO USER COMMENTS IN BUSINESS INTELLIGENCE VISUALIZATIONS

(71) Applicant: International Business Machines Corporation, Armonk, NY (US)

(72) Inventors: Vinay Wadhwa, Ottawa (CA); Graham A. Watts, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 16/009,393

(22) Filed: Jun. 15, 2018

(65) Prior Publication Data

US 2019/0385242 A1   Dec. 19, 2019

(51) Int. Cl.
*G06Q 50/00* (2012.01)
*G06F 3/0484* (2013.01)
*G06T 11/20* (2006.01)
*G06F 40/20* (2020.01)

(52) U.S. Cl.
CPC ......... *G06Q 50/01* (2013.01); *G06F 3/04845* (2013.01); *G06F 3/04842* (2013.01); *G06F 40/20* (2020.01); *G06T 11/206* (2013.01)

(58) Field of Classification Search
CPC ..... G06Q 50/01; G06F 3/04845; G06F 40/20; G06F 3/04842; G06F 40/106; G06F 40/10; G06T 11/206
USPC ........................................................ 715/753
See application file for complete search history.

(56) References Cited

U.S. PATENT DOCUMENTS

| | | | |
|---|---|---|---|
| 6,392,668 B1* | 5/2002 | Murray | G06Q 30/0207 715/738 |
| 10,565,268 B2* | 2/2020 | Winnemoeller | G06Q 50/01 |
| 2009/0055756 A1* | 2/2009 | Heer | G06F 16/904 715/760 |
| 2012/0311501 A1* | 12/2012 | Nonez | G06F 3/04817 715/838 |
| 2013/0124965 A1 | 5/2013 | Elias et al. | |
| 2013/0246947 A1* | 9/2013 | Chmiel | G06F 3/0484 715/763 |
| 2014/0157150 A1 | 6/2014 | Durvasula et al. | |
| 2014/0278364 A1* | 9/2014 | Grosset | G06F 40/40 704/9 |
| 2015/0161550 A1 | 6/2015 | Siklos et al. | |
| 2017/0344209 A1* | 11/2017 | Gordon | G06F 3/0484 |

OTHER PUBLICATIONS

Tsuda et al., "Visualization of Discussions in Comments for a Blog Entry Using KeyGraph and Comment Scores," Proceedings of 4th WSEAS International Conference on E-Activities, Nov. 2005, 6 pages.

\* cited by examiner

*Primary Examiner* — Andrey Belousov
(74) *Attorney, Agent, or Firm* — Yee & Associates, P.C.

(57) ABSTRACT

Applying visual treatments to business intelligence dashboards is provided. A user comment in a dashboard of a business intelligence tool is analyzed. A context of the user comment is identified. A visual treatment is applied to a data visualization on the dashboard based on the context of the user comment.

14 Claims, 26 Drawing Sheets

FROM FIG. 8A

FIG. 9A

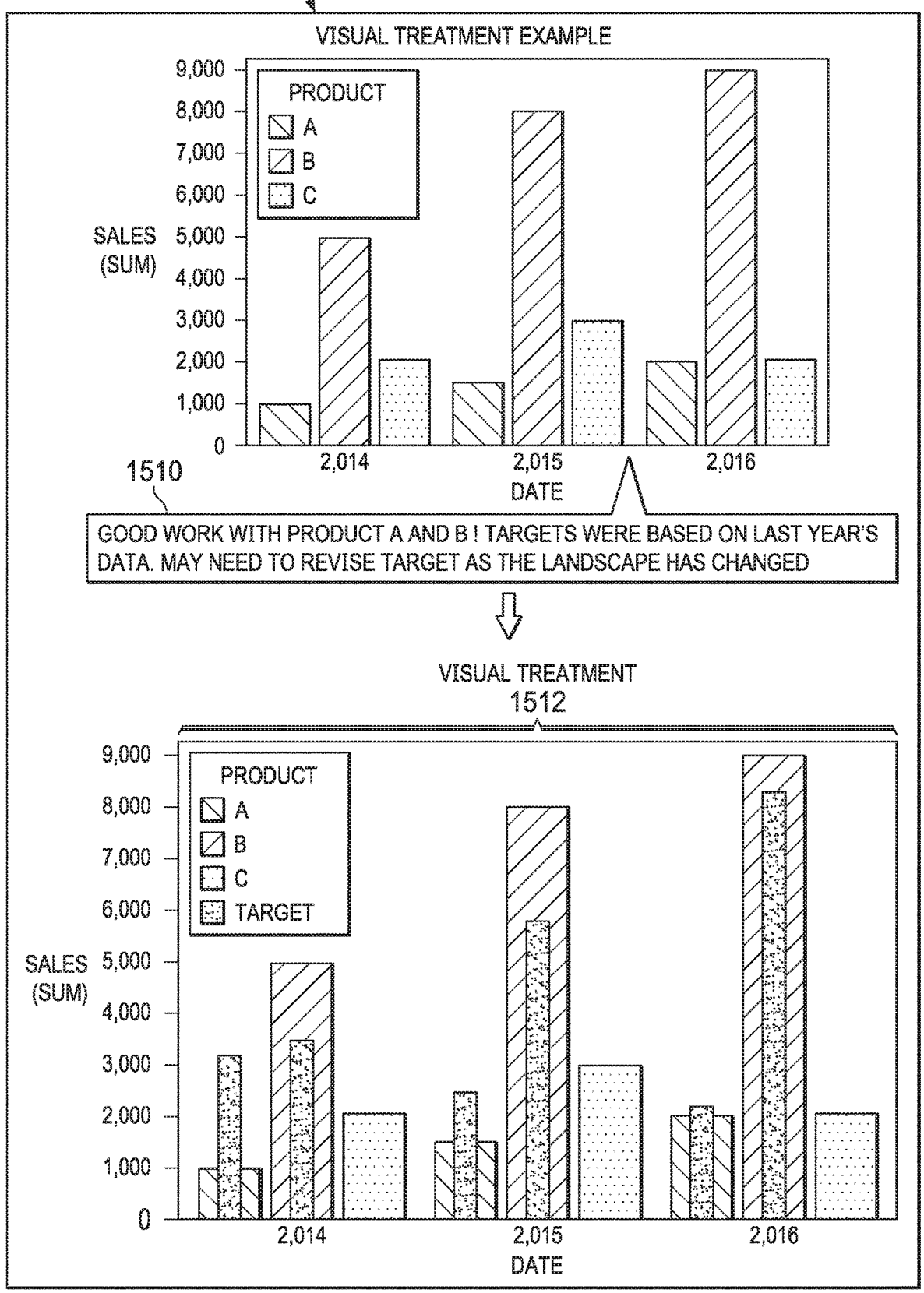

SMART ANCHORING OF VISUAL TREATMENTS CORRESPONDING TO USER COMMENTS IN BUSINESS INTELLIGENCE VISUALIZATIONS

BACKGROUND

1. Field

The disclosure relates generally to business intelligence and more specifically to performing analysis of user comments in a business intelligence dashboard to provide additional comment-related insights into data of a dashboard visualization.

2. Description of the Related Art

Business intelligence comprises strategies and technologies used by companies and enterprises for data analysis of business information. Business intelligence technologies provide historical, current, and predictive views of business operations. Common functions of business intelligence technologies include data reporting, online analytics processing, data analytics, data mining, process mining, complex event processing, business performance management, benchmarking, predictive analytics, and prescriptive analytics. Business intelligence technologies can handle large amounts of structured and unstructured data to help identify, develop, and otherwise create new business strategies. Business intelligence technologies allow for easy interpretation of big data. Identifying new business opportunities and implementing an effective strategy based on insights can provide businesses with a competitive market advantage and long-term stability.

Business intelligence is most effective when it combines external data derived from the market in which a company operates with internal data, such as financial and operations data, of the company. When combined, external and internal data can provide a complete picture which, in effect, creates an "intelligence" that cannot be derived from any singular set of data. Thus, business intelligence tools empower companies to gain insight into new markets, to assess demand and suitability of products and services for different market segments, and to gauge the impact of marketing efforts.

A business intelligence dashboard is a visual display of the data needed by the company to achieve one or more of its goals and objectives. Dashboards consolidate and arrange the data on a single screen so a user can view the data at a glance. Dashboards often provide views of key performance indicators, which are relevant to a particular business goal or objective. Business intelligence tools often display a dashboard on a web page that is linked to a database, which allows the data visualization to be constantly updated. For example, a manufacturing dashboard may show numbers related to productivity, such as number of parts manufactured per minute, number of failed quality inspections per hour, and the like.

SUMMARY

According to one illustrative embodiment, a computer-implemented method for applying visual treatments to business intelligence dashboards is provided. A computer analyzes a user comment in a dashboard of a business intelligence tool. The computer identifies a context of the user comment. The computer applies a visual treatment to a data visualization on the dashboard based on the context of the user comment. According to other illustrative embodiments, a computer system and computer program product for applying visual treatments to business intelligence dashboards are provided.

BRIEF DESCRIPTION OF THE DRAWINGS

FIGS. 9A-9B are a diagram illustrating an example of emphasizing data visualizations corresponding to user comments in accordance with an illustrative embodiment;

FIGS. 15A-15B are diagrams illustrating examples of visual treatments in accordance with an illustrative embodiment.

DETAILED DESCRIPTION

Figure 1:
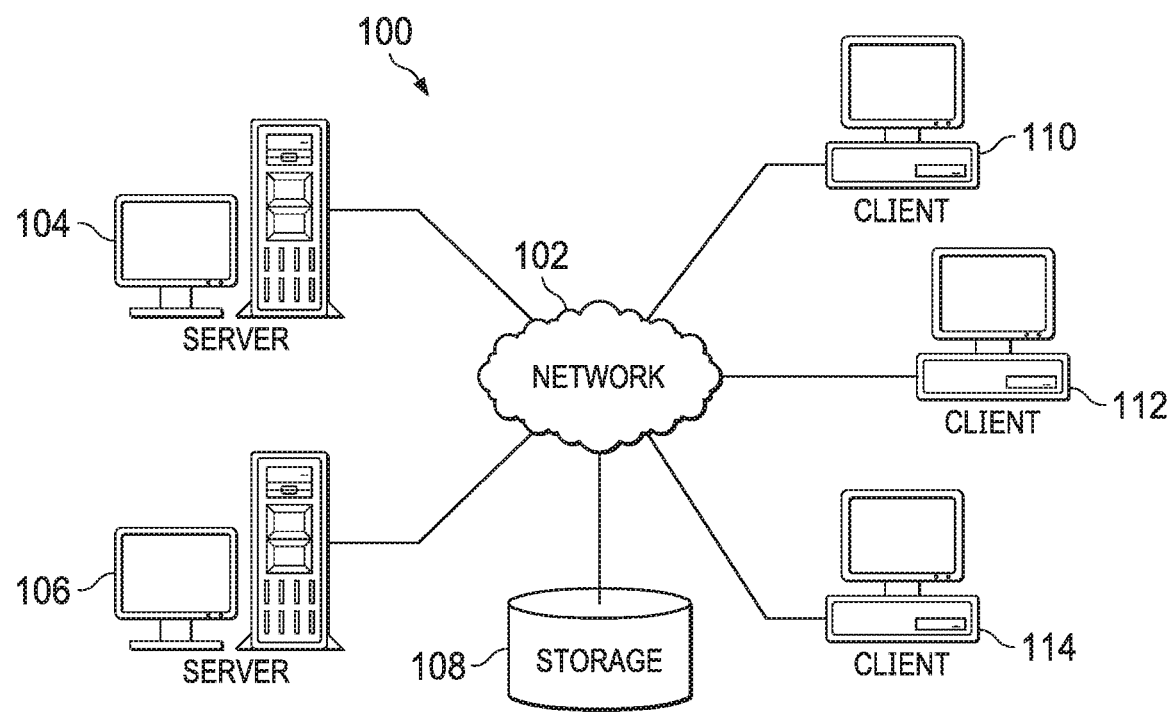
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
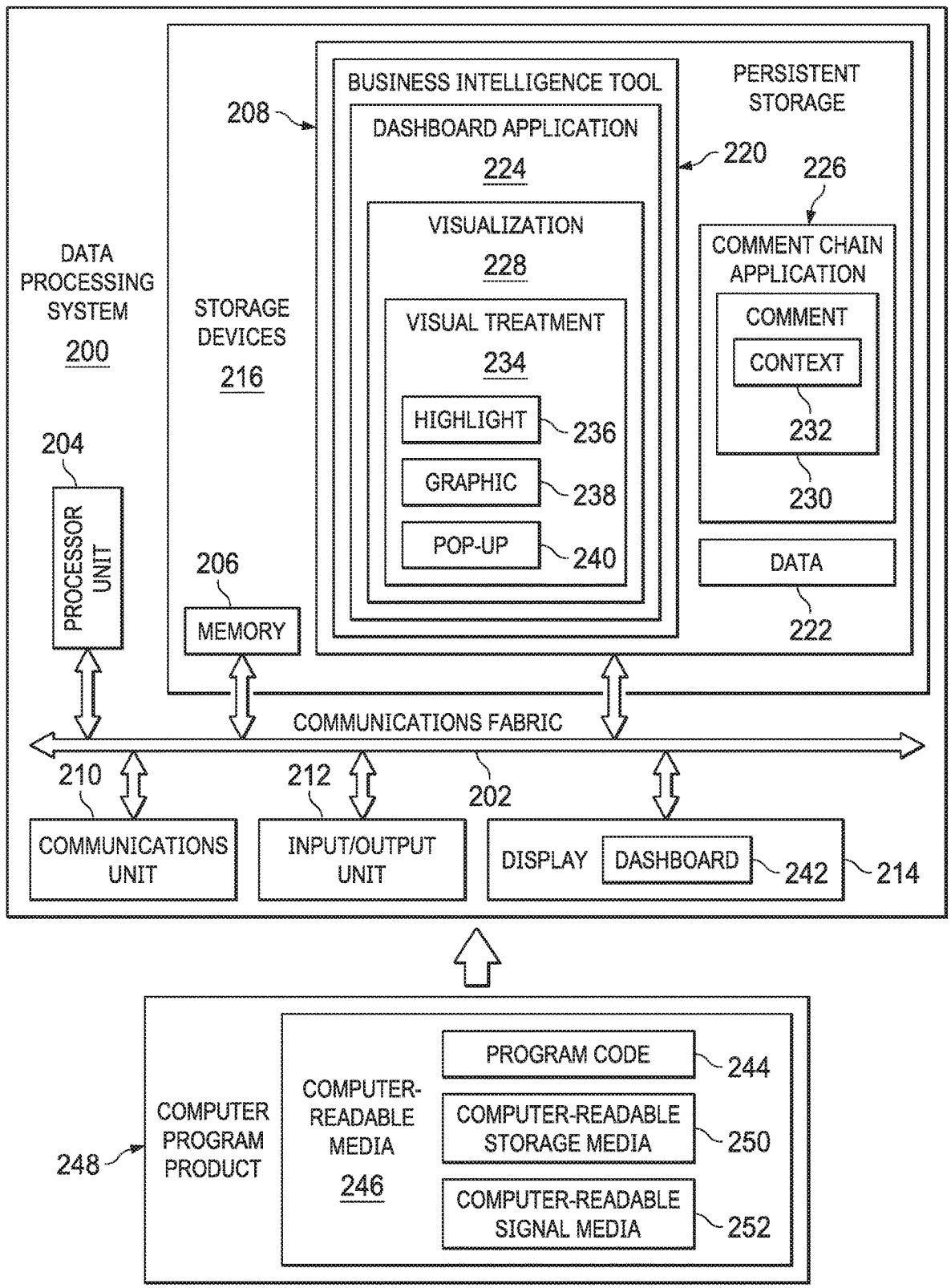
FIG. 2 is a diagram of a data processing system in which illustrative embodiments may be implemented.
Figure 3:
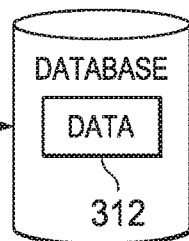
FIG. 3 is a diagram illustrating an example of a business intelligence data visualization management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, computers with high-speed connections to network 102. In addition, server 104 and server 106 may provide a set of business data management services. For example, server 104 and server 106 may perform retrieval of business data from one or more databases in response to receiving data queries from registered client devices. Further, it should be noted that server 104 and server 106 may represent a cluster of computers in a data center hosting a plurality of business data management services. Alternatively, server 104 and server 106 may represent computer nodes in a cloud environment that provides business data management services.

Client 110, client 112, and client 114 also connect to network 102. Clients 110, 112, and 114 are registered client devices of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, laptop computers, handheld computers, smart phones, smart watches, smart televisions, and the like, with wire or wireless communication links to network 102. Users of clients 110, 112, and 114 may utilize clients 110, 112, and 114 to access the business data management services provided by server 104 and server 106.

In response to clients 110, 112, and 114 receiving requested business data from servers 104 and 106, clients 110, 112, and 114 utilize business intelligence tools to generate visualizations of the business data on an interactive user interface dashboard. In addition, clients 110, 112, and 114 may receive user comments on the visualizations of the business data. Further, clients 110, 112, and 114 analyze the user comments to determine context of the user comments, apply one or more visual treatments to data corresponding to the context of the user comments in the visualizations, and display the visual treatments in the visualizations.

Storage 108 is a network storage device capable of storing any type of data in a structured format or an unstructured format. In addition, storage 108 may represent a plurality of network storage devices. Further, storage 108 may store, for example, a plurality of different types of business data corresponding to one or more businesses, identifiers for a plurality of different client devices and client device users, and the like. Furthermore, storage unit 108 may store other types of data, such as authentication or credential data that may include user names, passwords, and biometric data associated with system administrators and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores business intelligence tool 220 and data 222. However, it should be noted that even though business intelligence tool 220 is illustrated as residing in persistent storage 208, in an alternative illustrative embodiment business intelligence tool 220 may be a separate component of data processing system 200. For example, business intelligence tool 220 may be a hardware component coupled to communication fabric 202 or a combination of hardware and software components. In another alternative illustrative embodiment, a first portion of business intelligence tool 220 may be located in data processing system 200 and a second portion of business intelligence tool 220 may be located in a server computer, such as server 104 in FIG. 1. In yet another alternative illustrative embodiment, business intelligence tool 220 may be located in the server computer, in addition to, or instead of, data processing system 200.

Also in this example, business intelligence tool 220 includes dashboard application 224 and comment chain application 226. Business intelligence tool 220 utilizes dashboard application 224 to generate visualization 228 of data 222. Visualization 228 is a graphical depiction, such as, for example, a graph, a chart, a diagram, a table, a grid, a figure, and the like, of data 222 or a user-selected segment of data 222. Data 222 may represent any type of business data corresponding to a company or enterprise. Data 222 also may represent a plurality of different types of business data.

Business intelligence tool 220 utilizes comment chain application 226 to receive and manage user comments, such as comment 230. Comment 230 is a user comment regarding visualization 228 of data 222. However, it should be noted that comment 230 may represents a chain of user comments regarding visualization 228.

In response to receiving comment 230 regarding visualization 228 of data 222, comment chain application 226 automatically analyzes comment 230 to determine context 232 of comment 230 as it relates to data 222 in visualization 228. Comment chain application 226 sends context 232 of comment 230 to dashboard application 224. Dashboard application 224 utilizes context 232 of comment 230 to determine visual treatment 234. Visual treatment 234 represents a set of one or more visual treatments that dashboard application 224 may apply to visualization 228 regarding data 222. In this example, visual treatment 234 includes highlight 236, graphic, 238, and pop-up 240. However, it should be noted that alternative illustrative embodiments may include other visual treatments, such as, for example, modification of current data visualizations, new data visualizations, new information, and the like.

Highlight 236 represents a highlighting action that accentuates a portion or multiple portions of data 222 in visualization 228 that corresponds to context 232 of comment 230. In addition, dashboard application 224 may generate and insert graphic 238 and/or pop-up 240 into visualization 228. Graphic 238 is a special graphic, such as, for example, a pyramid, a lightning bolt, a heart, a balloon, a star, a flag, and the like. Dashboard application 224 may insert graphic 238 adjacent to or in close proximity to highlight 236. In this case, graphic 236 corresponds to highlight 234. Alternatively, dashboard application 224 may insert graphic 238 in comment 230 and in the portion of data 222 in visualization 228 that corresponds to context 232 of comment 230. Pop-up 240 is a pop-up text box that contains addition information, insights, or focus points corresponding to context 232 of comment 230. Upon receiving an indication that a user selected graphic 238 or comment 230, dashboard application 224 determines and applies the appropriate visual treatment 238 to visualization 228.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a microphone, a keypad, a keyboard, a mouse, and/or some other suitable input device. Display 214 provides a mechanism to display information to a user and may include touch screen capabilities to allow the user to make on-screen selections through user interfaces or input data, for example. In this example, display 214 displays dashboard 242. Dashboard 242 is an interactive user interface that shows visualization 228 of data 222, along with visual treatment 234 and comment 230.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Business intelligence tools commonly utilize dashboards for data reporting or exploration. These dashboards typically have interactive data visualizations. It is also common for these dashboards to allow for publishing and sharing of these data visualizations to enable collaboration between users by, for example, embedding visualizations in portals or as infographics to tell a story about the data. It is also typical to allow users to comment on these data visualizations to form comment chains. However, some comments quite often go in new directions that are no longer related to the current data visualization. As such, when a user later looks at the comments, the user cannot interpret all of the comments in the context of the visualization that initiated the chain of comments.

Illustrative embodiments perform textual and semantic analytics on comments corresponding to a data visualization in a dashboard and automatically apply visual treatments related to the comments to the data visualization using visualization actions. Illustrative embodiments perform the textual and semantic analysis on the comments corresponding to a published interactive data visualization to determine a context of the comments, infer the focus points within the visualization based on the contextual analysis of the comments, and apply the focus points related to the comments in the visualization using visualization actions. These visualization actions may include, for example, highlighting axes or data points in the visualization, overlaying ranges on top of the visualization when the user focuses on a particular comment, and the like.

Illustrative embodiments utilize a comment application that is triggered when a user adds a comment to a dashboard data visualization. This comment application uses contextual analysis of the comment to determine which part of the data within the dashboard visualization the comment relates to. Output of the contextual analysis may be, for example, names of identified dimensions or measures that map back to data source metadata used by the visualization, specific data values or data ranges associated with the identified dimensions or measures, and possible actions to apply to the visualization based on heuristics.

Illustrative embodiments feed the contextual analysis output into a visualization rendering module. This visualization rendering module selects an appropriate means of highlighting the dataset in the visualization that corresponds to the context of the comment by providing a set of user interface actions to perform the highlight on the dataset. Illustrative embodiments may accomplish this by using an expert system, such as a simple rule-based system, that maps a particular context to a particular visualization treatment for a given visualization type.

For example, if the comment relates to specific dimensions or measures, which are visible on one of the axes of the visualization, then illustrative embodiments selectively highlight those portions of the visualization that relate to those specific dimensions or measures or show those specific dimensions or measures in an overlay. Further, illustrative embodiments may show in the visualization the driving forces for those specific dimensions or measures. For example, illustrative embodiments may add a pop-up or an annotation to the visualization to provide additional insight or details regarding the driving forces. By a user activating (e.g., clicking on) a special graphic or icon inserted by illustrative embodiments into the visualization, illustrative embodiments generate the pop-up showing the comment-related insight. The comment-related insight may be, for example, outdoor protection product line returns for a company were $12,000.00 more than the previous year causing the decline in gross profits for that particular product line.

As another example, if the comment is centered around conditions that happen at specific points (e.g., major sales drops at specific points in time) and the visualization is showing a timeline, then illustrative embodiments may infer the specific time points based on the conditions. Further, illustrative embodiments may highlight those time points in the visualization.

Thus, illustrative embodiments analyze comments on dashboard data visualizations to infer context associated with the comments. Once illustrative embodiments infer the context, illustrative embodiments then determine an appropriate visual treatment to apply to the data visualization to make the data visualization relevant to the comments. The visual treatments not only highlight the comment, but provide additional information or details that illustrative embodiments determine to be related to the context of the comments. As a result, illustrative embodiments transform the visualization increasing user understanding of the data within the visualization in the context of the comments.

With reference now to FIG. 3, a diagram illustrating an example of a business intelligence data visualization management system is depicted in accordance with an illustrative embodiment. Business intelligence data visualization management system 300 may be implemented in a network of data processing systems, such as network data processing system 100 in FIG. 1. Business intelligence data visualization management system 300 is a system of hardware and software components for performing analysis of user comments corresponding to data shown in a visualization on a business intelligence dashboard and providing additional comment-related insights into the data corresponding to the user comments based on the analysis.

In this example, business intelligence data visualization management system 300 includes server 302 and client 304. However, it should be noted that business intelligence data visualization management system 300 may include any number of servers, clients, and other data processing systems not shown. Server 302 may be, for example, server 104 in FIG. 1. Client 304 may be, for example, client 110 in FIG. 1.

Client 304 includes business intelligence tool 306, such as business intelligence tool 220 in FIG. 2. A user of client 304 utilizes business intelligence tool 306 to send data query 308 to server 302. Data query 308 may represent a request for any type of business data corresponding to a company or enterprise.

In response to receiving data query 308, server 302 utilizes data query engine 310 to retrieve data 312 from database 314. Data 312 represent a portion of the data in database 314 that corresponds to data query 308. Server 302 sends requested data 312 to business intelligence tool 306 as data query result 316.

In response to receiving data 312 in data query result 316, business intelligence tool 306 utilizes visualization rendering module 318 of dashboard application 320 to generate visualization 322 of data 312. Dashboard application 320 and visualization 322 may be, for example, dashboard application 224 and visualization 228 in FIG. 2. Also, it should be noted that visualization 228 may represent a set of one or more visualizations corresponding to data 312.

In this example, visualization 322 is graph 324, which represents data 312. Further, dashboard application 320 identifies data context 326. Data context 326 represents the context of the data (i.e., data 312) in visualization 322. Data context 326 may be, for example, one or more specific data values, specific data ranges, axes of visualization 322, and data points in visualization 322.

Business intelligence tool 306 also includes comment chain application 328. Comment chain application 328 receives and manages a chain of one or more user comments, such as user comment 330, which corresponds to data 312 or a portion of data 312 represented in visualization 322. Comment chain application 328 utilizes text analyzer module 332 to analyze user comment 330. Text analyzer module 332 may use, for example, text analysis, semantic analysis, natural language processing, and the like to analyze user comment 330. Based on the analysis of user comment 330, text analyzer module 332 generates inferred context 334. Inferred context 334 represents the context of user comment 330 as it relates to data context 326 of data 312 shown in visualization 322.

Text analyzer module 332 sends inferred context 334 to visual action module 336 of dashboard application 320. Visual action module 336 utilizes inferred context 334 of user comment 330 to determine and generate the appropriate visual treatment 338 to apply to graph 324 in visualization 322 of data 312. Visual treatment 338 may be, for example, visual treatment 228 in FIG. 2.

Figure 4:
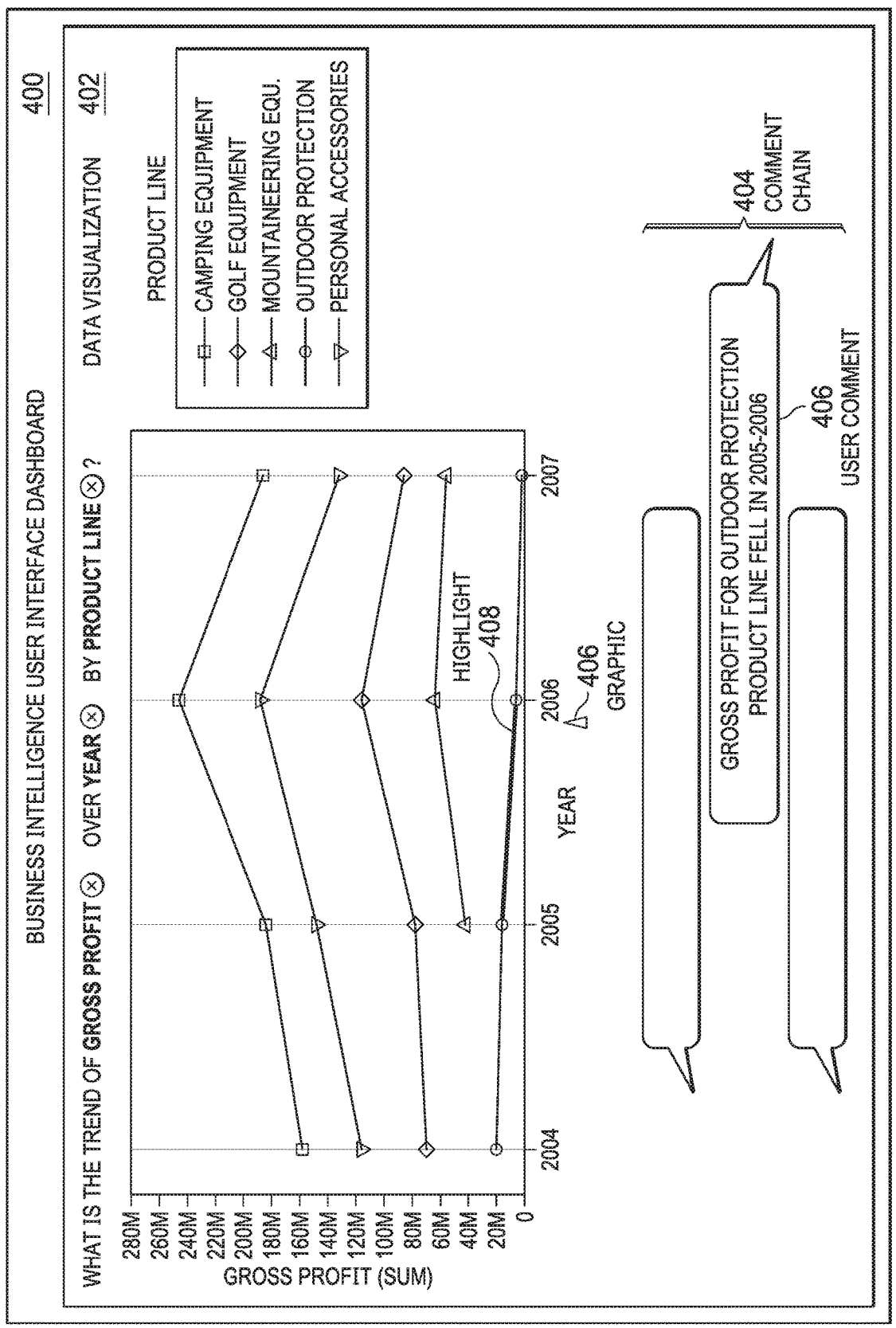
FIG. 4 is a diagram illustrating an example of a business intelligence user interface dashboard with highlight and graphic corresponding to a user comment in accordance with an illustrative embodiment.

With reference now to FIG. 4, a diagram illustrating an example of a business intelligence user interface dashboard with highlight and graphic corresponding to a user comment is depicted in accordance with an illustrative embodiment. Business intelligence user interface dashboard 400 may be implemented in a business intelligence tool, such as, for example, business intelligence tool 306 in FIG. 3. Business intelligence user interface dashboard 400 includes data visualization 402, which shows the trend of gross profits over several years by different product lines for a company. Business intelligence user interface dashboard 400 also includes comment chain 404, which is a set of user comments regarding data visualization 402.

Comment chain 404 includes user comment 406, which indicates that gross profit for the outdoor protection product line fell in 2005-2006. The business intelligence tool analyzes user comment 406 to identify a context of user comment 406. Further, the business intelligence tool generates and applies highlight 408, which corresponds to the portion of data visualization 402 that relates to the context of user comment 406. In addition, the business intelligence tool generates and applies graphic 410 to data visualization 402. Graphic 410, which is an interactive graphic, corresponds to highlight 408. In other words, when a user selects graphic 410, the business intelligence tool displays additional information, insights, or focus points regarding user comment 406.

Figure 5:
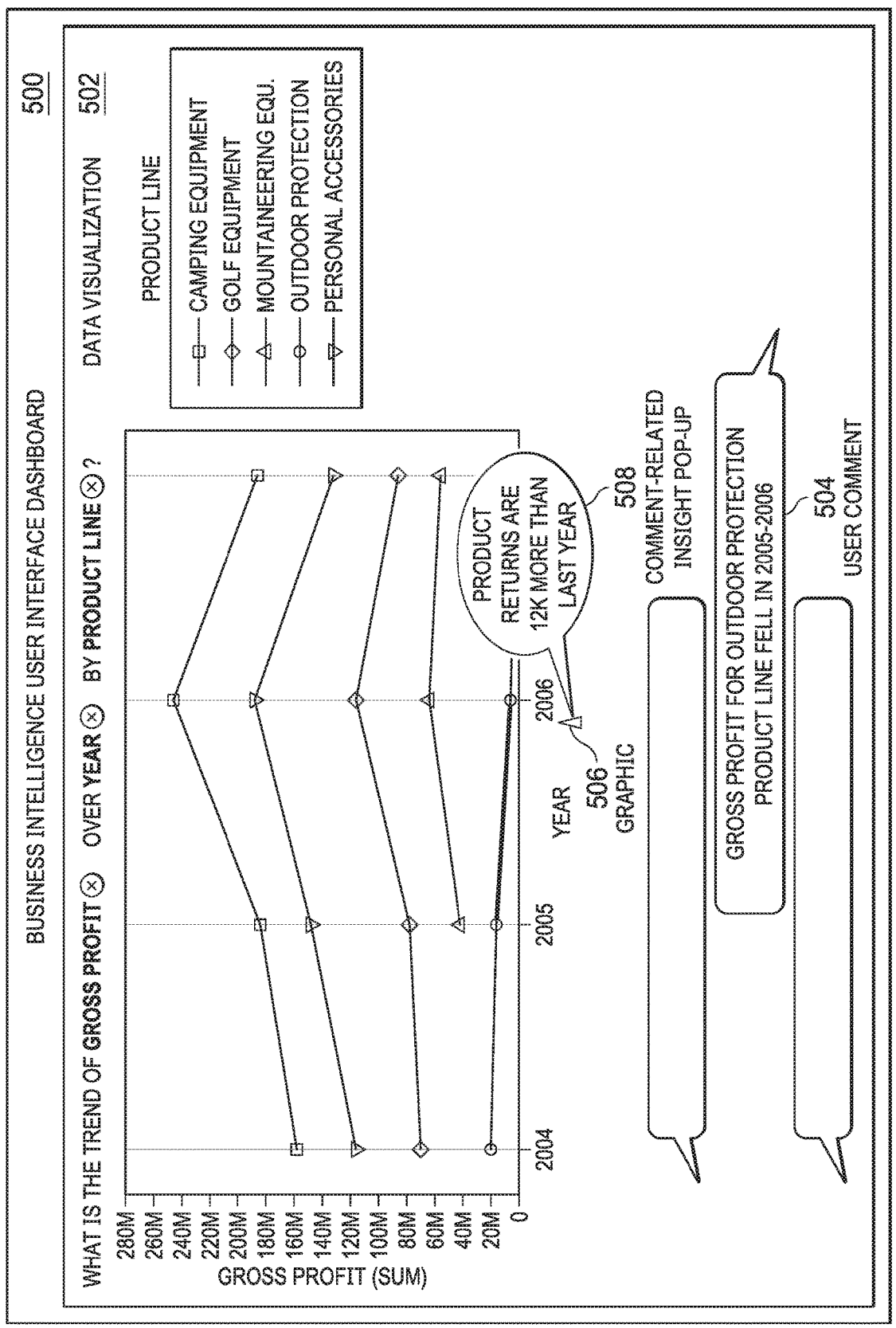
FIG. 5 is a diagram illustrating an example of a business intelligence user interface dashboard with additional insight corresponding to a user comment in accordance with an illustrative embodiment.

With reference now to FIG. 5, a diagram illustrating an example of a business intelligence user interface dashboard with insight corresponding to a user comment is depicted in accordance with an illustrative embodiment. Business intelligence user interface dashboard 500 is similar to business intelligence user interface dashboard 400 in FIG. 4. Business intelligence user interface dashboard 500 includes data visualization 502, which shows the same trend of gross profits over several years by the different product lines for the company as data visualization 402 in FIG. 4. Business intelligence user interface dashboard 500 also includes user comment 504, which is the same as user comment 406 in FIG. 4. When a user selects graphic 506, which is the same as graphic 410 in FIG. 4, the business intelligence tool generates and applies comment-related insight pop-up 508 to data visualization 502. In this example, comment-related insight pop-up 508 indicates that outdoor protection product returns are $12,000.00 more than last year, which provides insight to the user as to why the gross profit for the outdoor protection product line fell in 2005-2006.

Figure 6A:
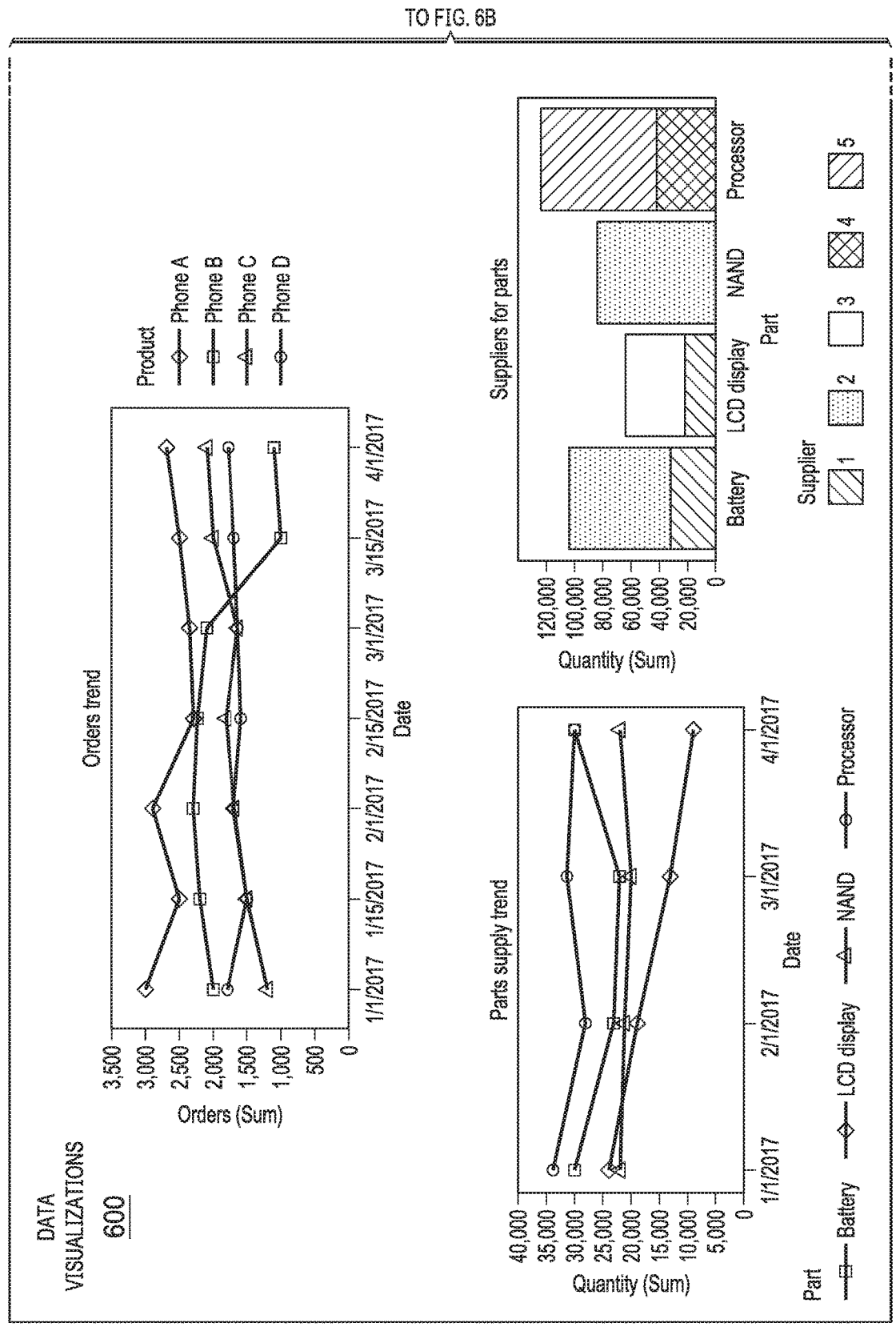
FIGS. 6A-6B are a diagram illustrating an example of data visualizations in accordance with an illustrative embodiment.
Figure 6B:
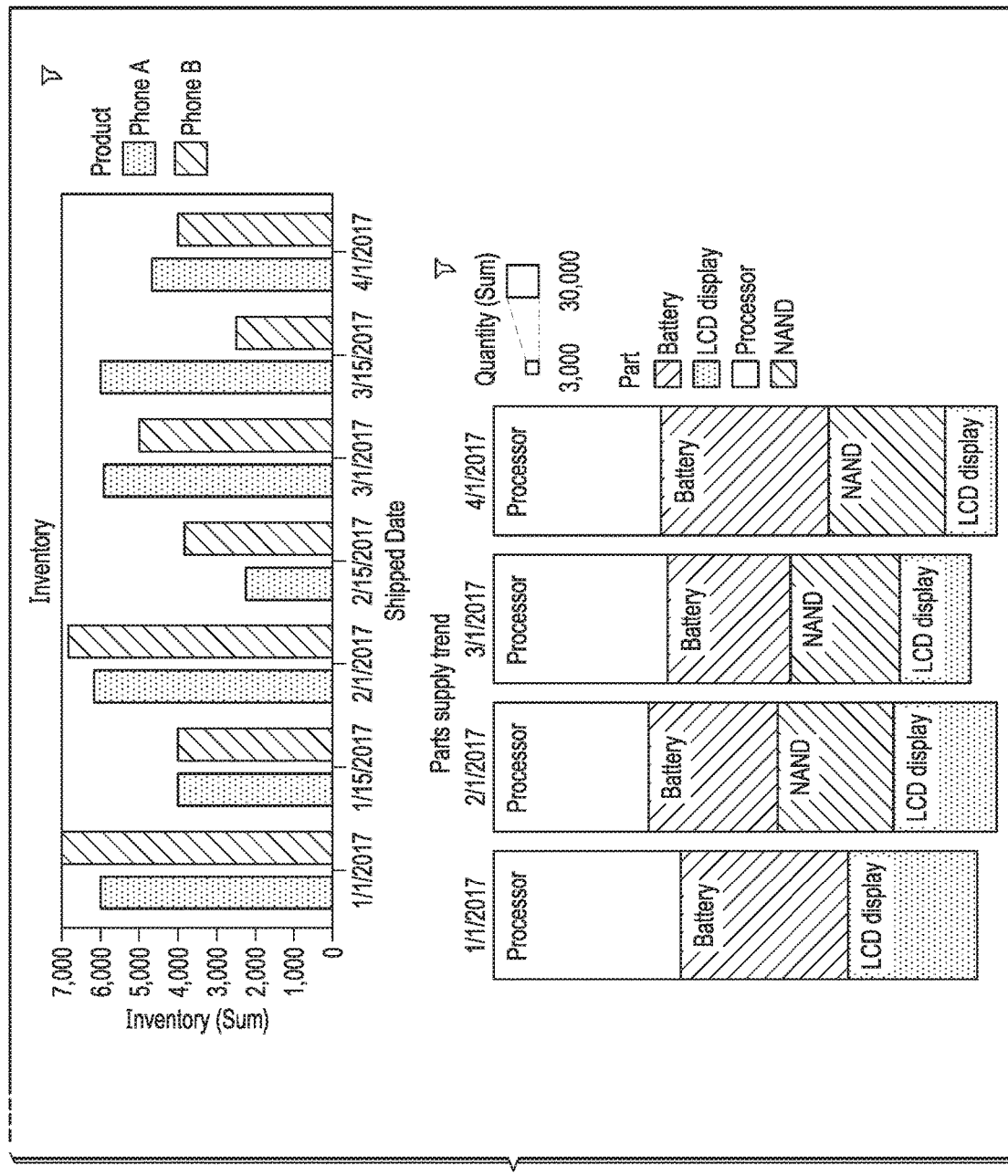

With reference now to FIGS. 6A-6B, a diagram illustrating an example of data visualizations is depicted in accordance with an illustrative embodiment. In this example, data visualizations 600 shows orders trend, inventory, parts supply trend, suppliers of parts, and parts supply trend data for the company.

Figure 7A:
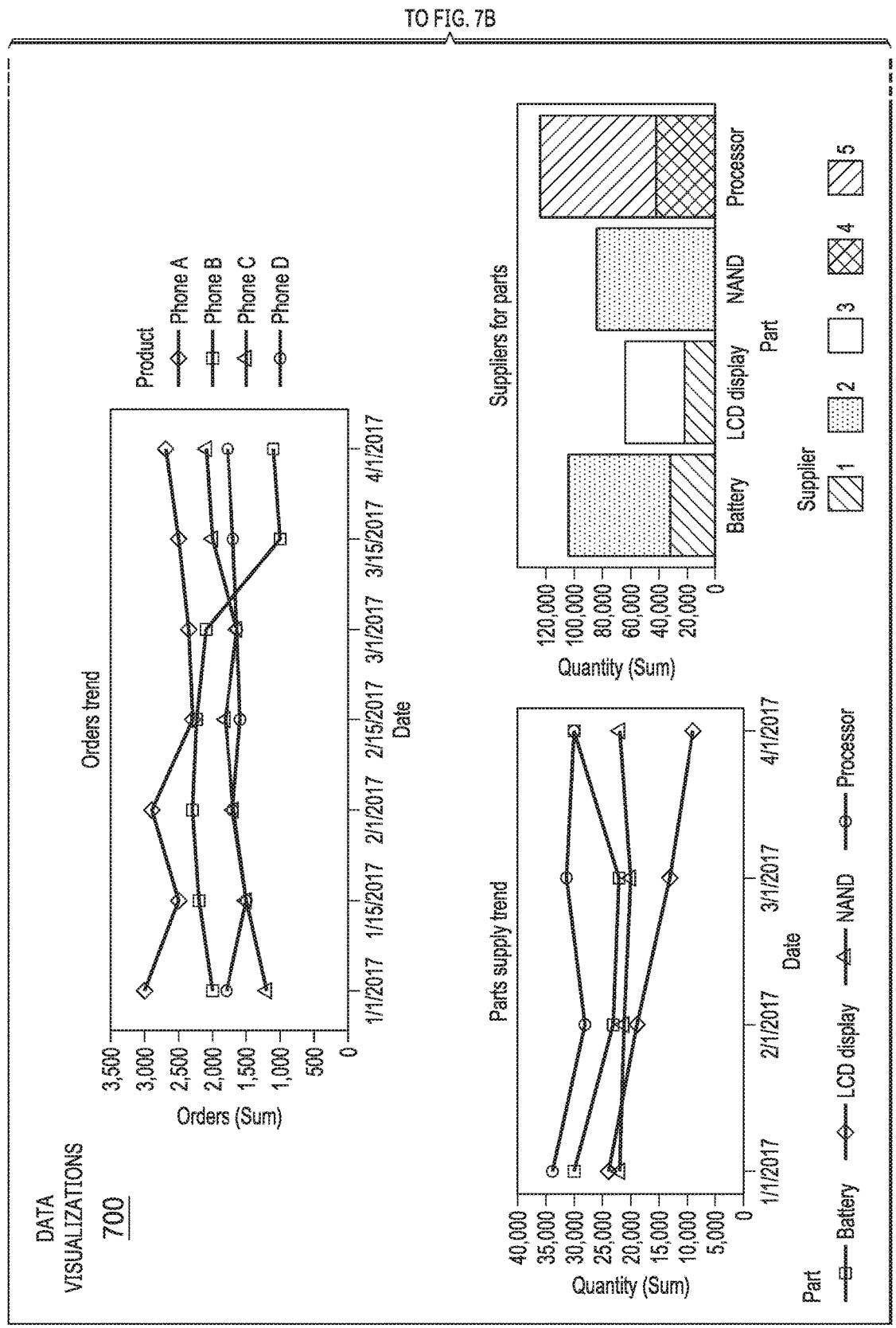
FIGS. 7A-7B are a diagram illustrating an example of data visualizations with comment chain in accordance with an illustrative embodiment.
Figure 7B:
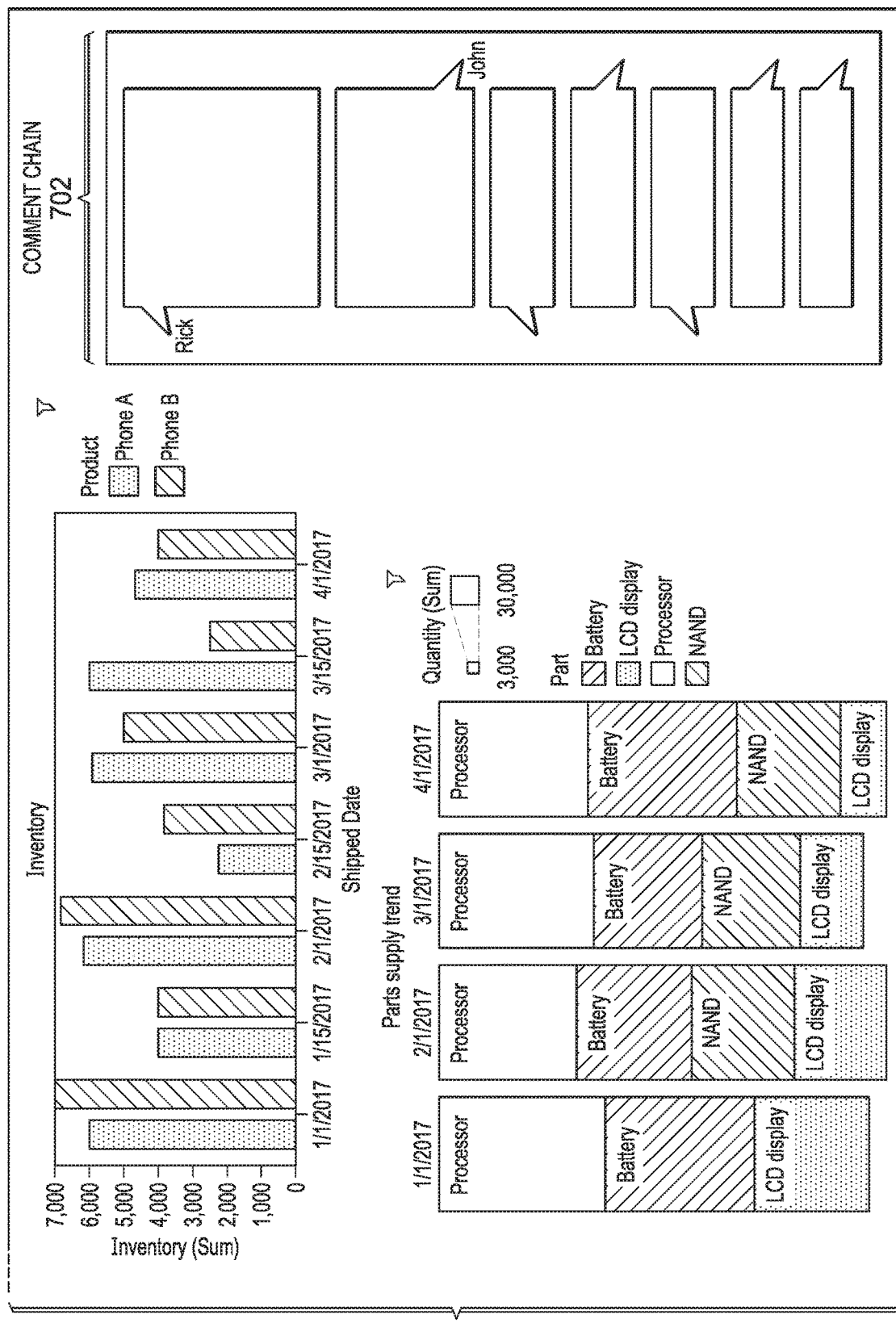

With reference now to FIGS. 7A-7B, a diagram illustrating an example of data visualizations with comment chain is depicted in accordance with an illustrative embodiment. Data visualizations 700 show the same information as data visualizations 600 in FIGS. 6A-6B, but also includes comment chain 702. Comment chain 702 is a set of user comments created by users Rick and John regarding data visualization 700.

Figure 8A:
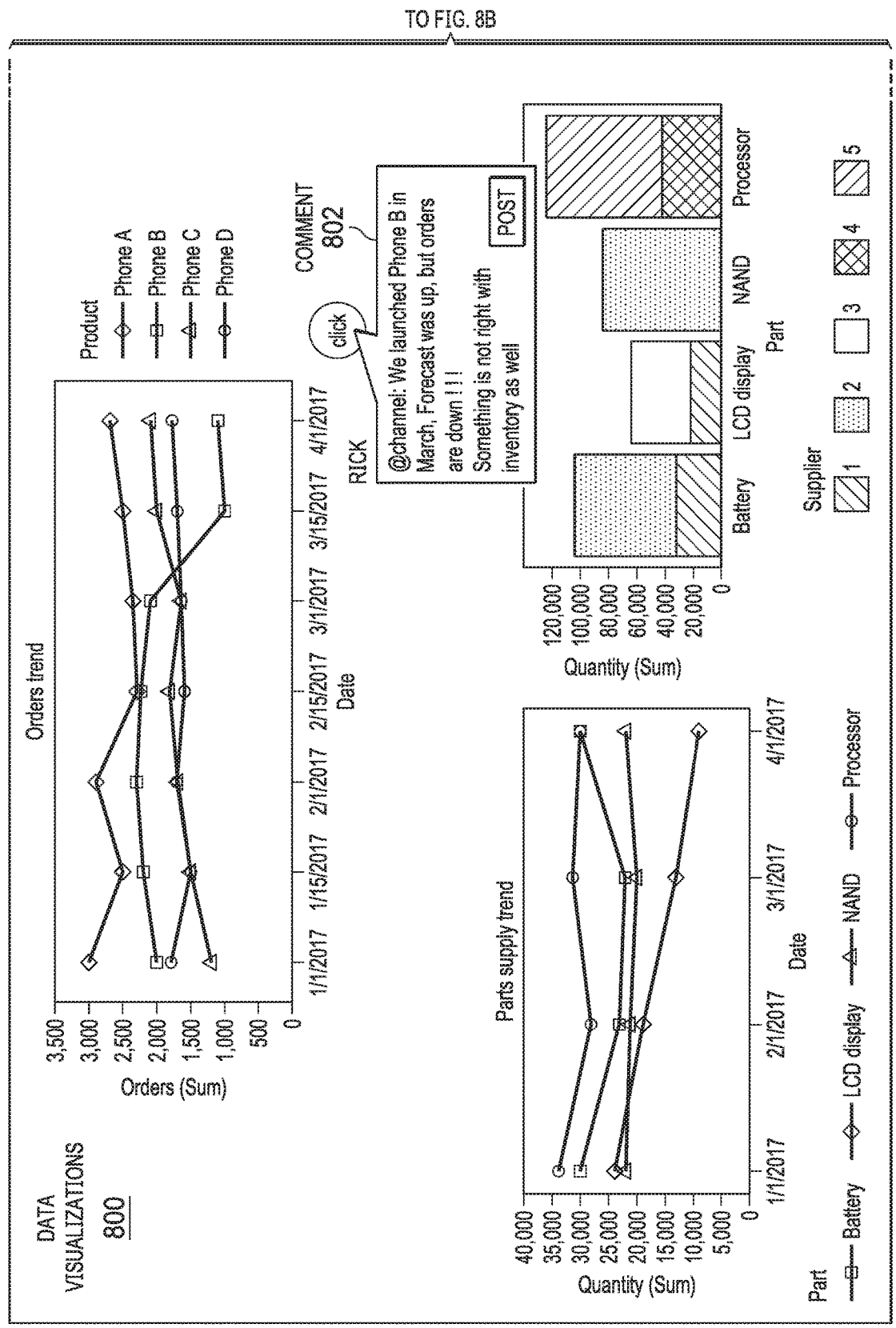
FIGS. 8A-8B are a diagram illustrating an example of adding a comment to data visualizations in accordance with an illustrative embodiment.
Figure 8B:
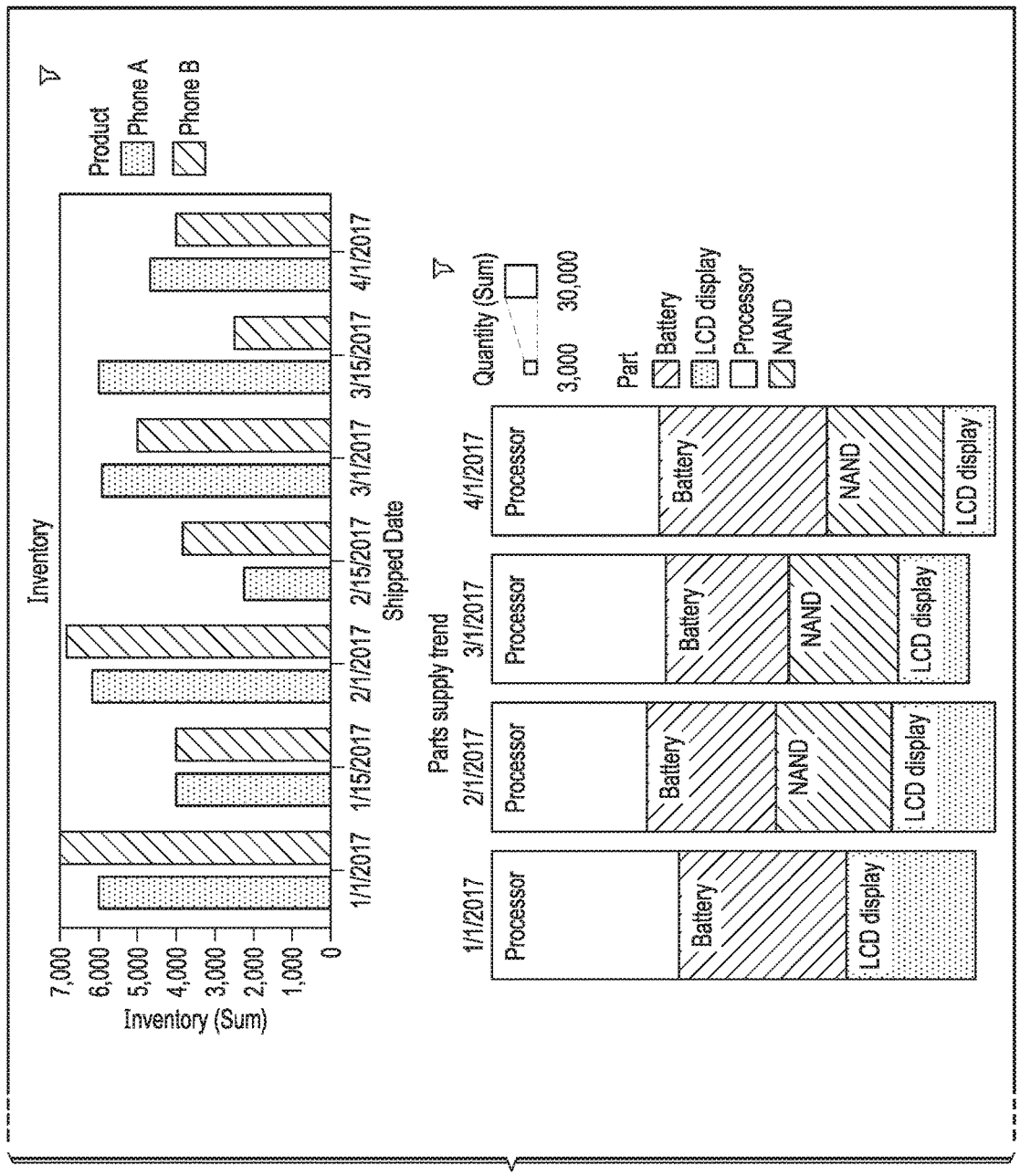

With reference now to FIGS. 8A-8B, a diagram illustrating an example of adding a comment to data visualizations is depicted in accordance with an illustrative embodiment. In this example, user Rick utilizes a mouse click, for example, to add comment 802 to data visualizations 800.

Figure 9A:
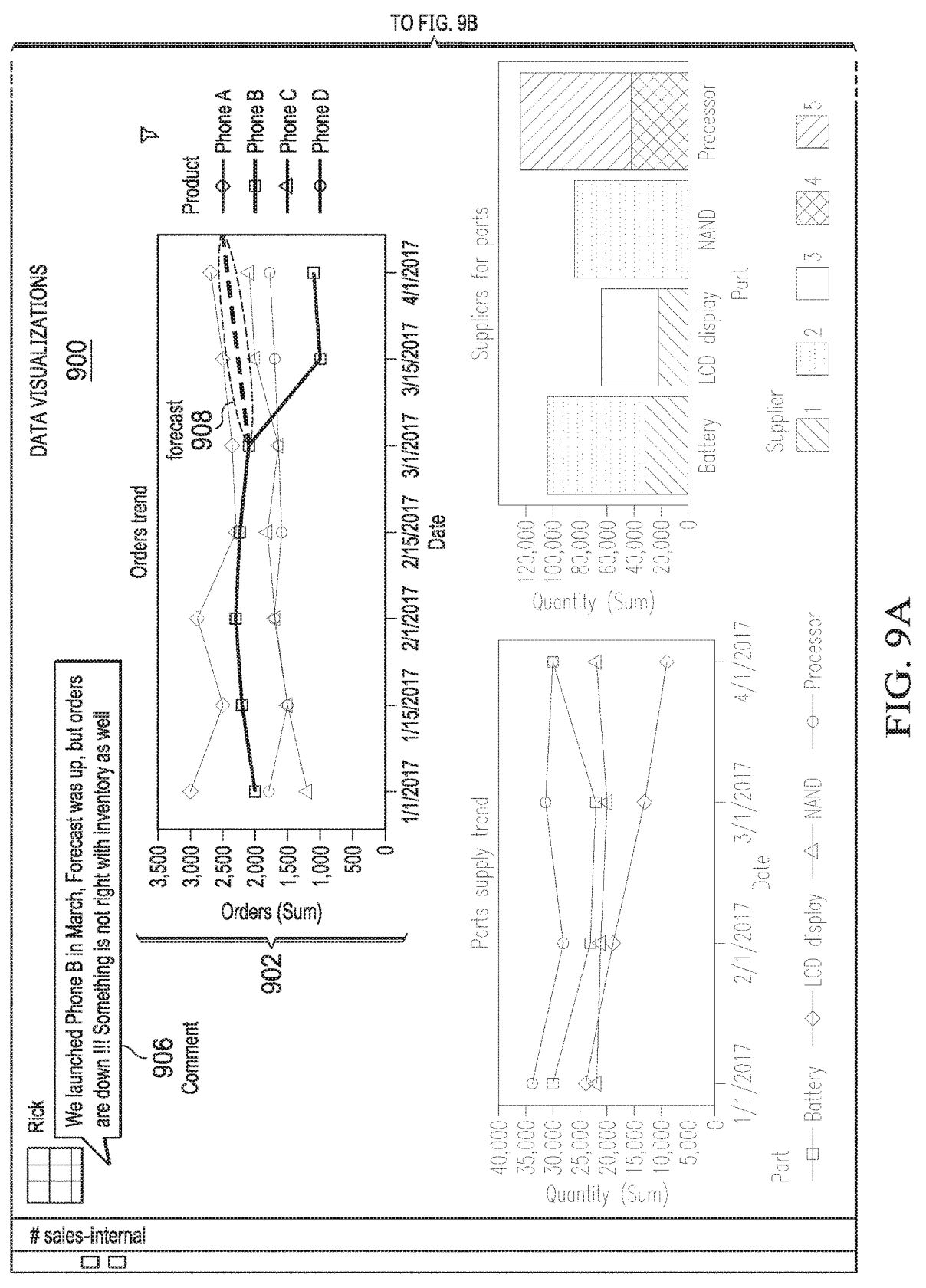
Figure 9B:
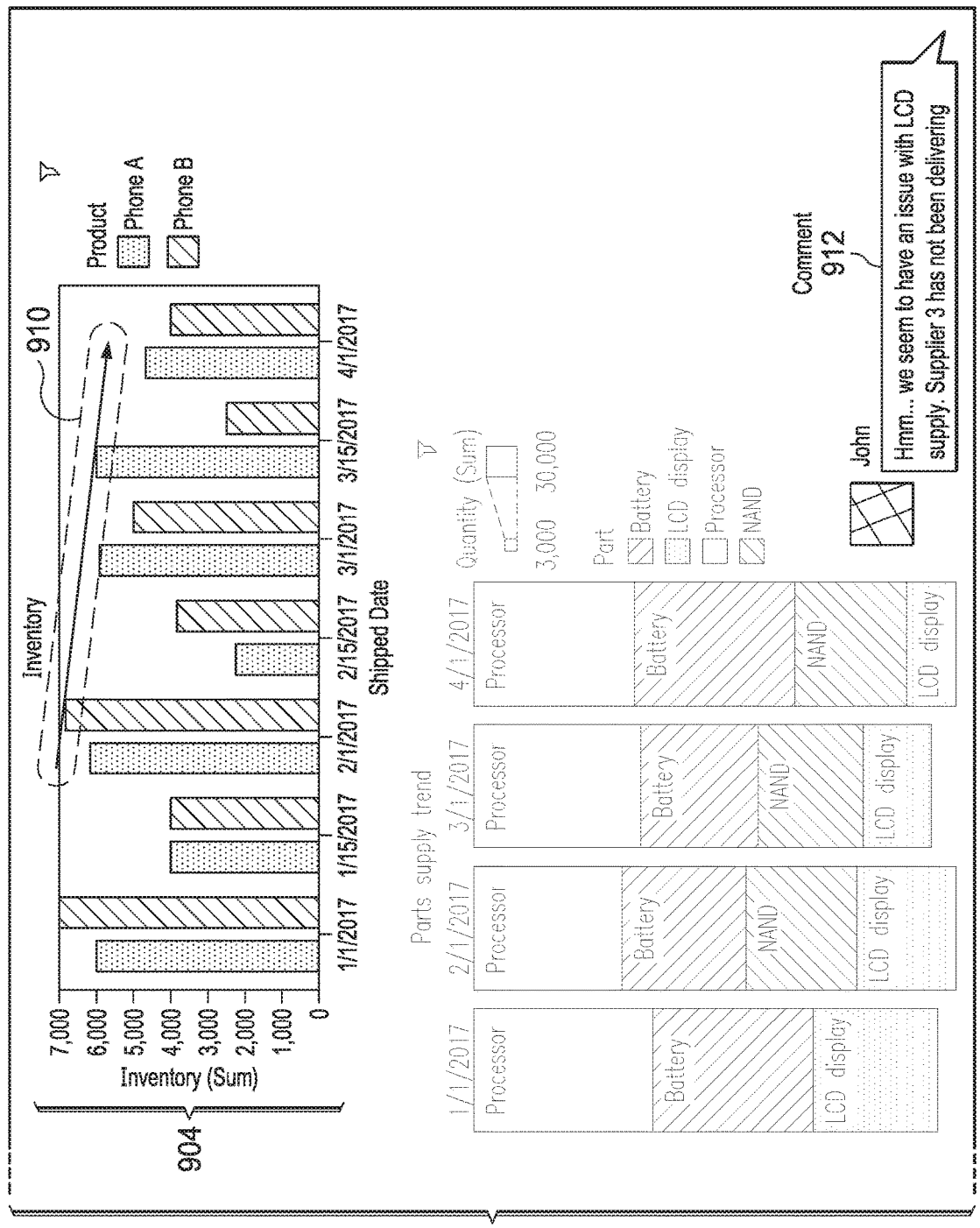

With reference now to FIGS. 9A-9B, a diagram illustrating an example of emphasizing data visualizations corresponding to user comments is depicted in accordance with an illustrative embodiment. In this example, data visualizations 900 emphasize data visualizations 902 and 904 (i.e., orders trend and inventory, respectively), which relate to the context of Rick's comment 906, and deemphasize the other data visualizations (i.e., parts supply trend, suppliers for parts, and parts supply trend). For example, data visualizations 900 may be an animated graphics interchange format frame that changes from an original frame to an emphasized frame.

It should be noted that comment 906 is the same as comment 802 in FIG. 8A. In addition, the business intelligence tool adds forecast 908 to orders trend data visualization 902 and downward trend 910 to inventory data visualization 904, which also relate to the context of Rick's comment 906. In response, John creates comment 912, which provides a possible reason to the issues raised by Rick's comment 906.

Figure 10A:
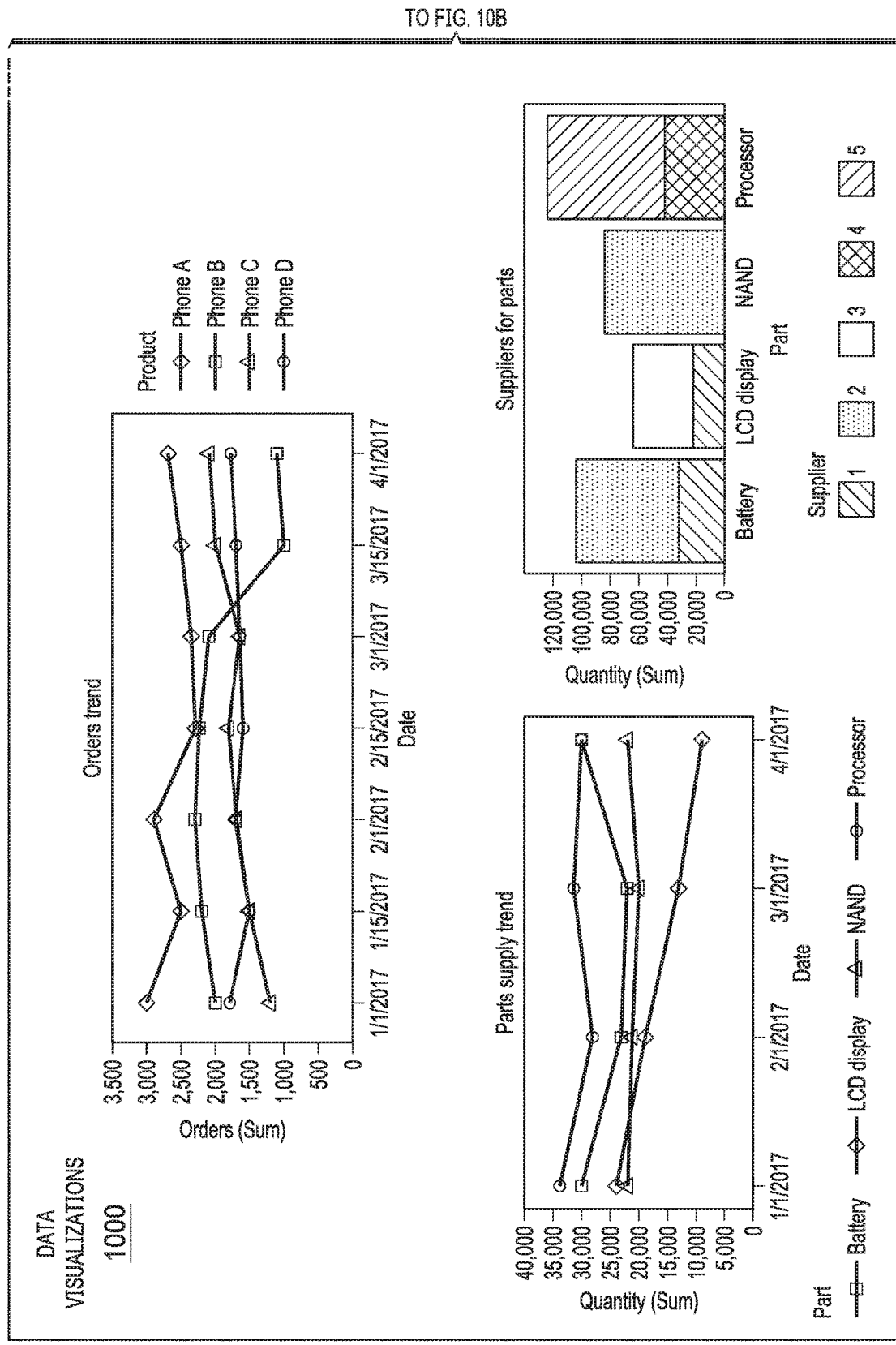
FIGS. 10A-10B are a diagram illustrating an example of data visualizations with relevant comment chain in accordance with an illustrative embodiment.
Figure 10B:
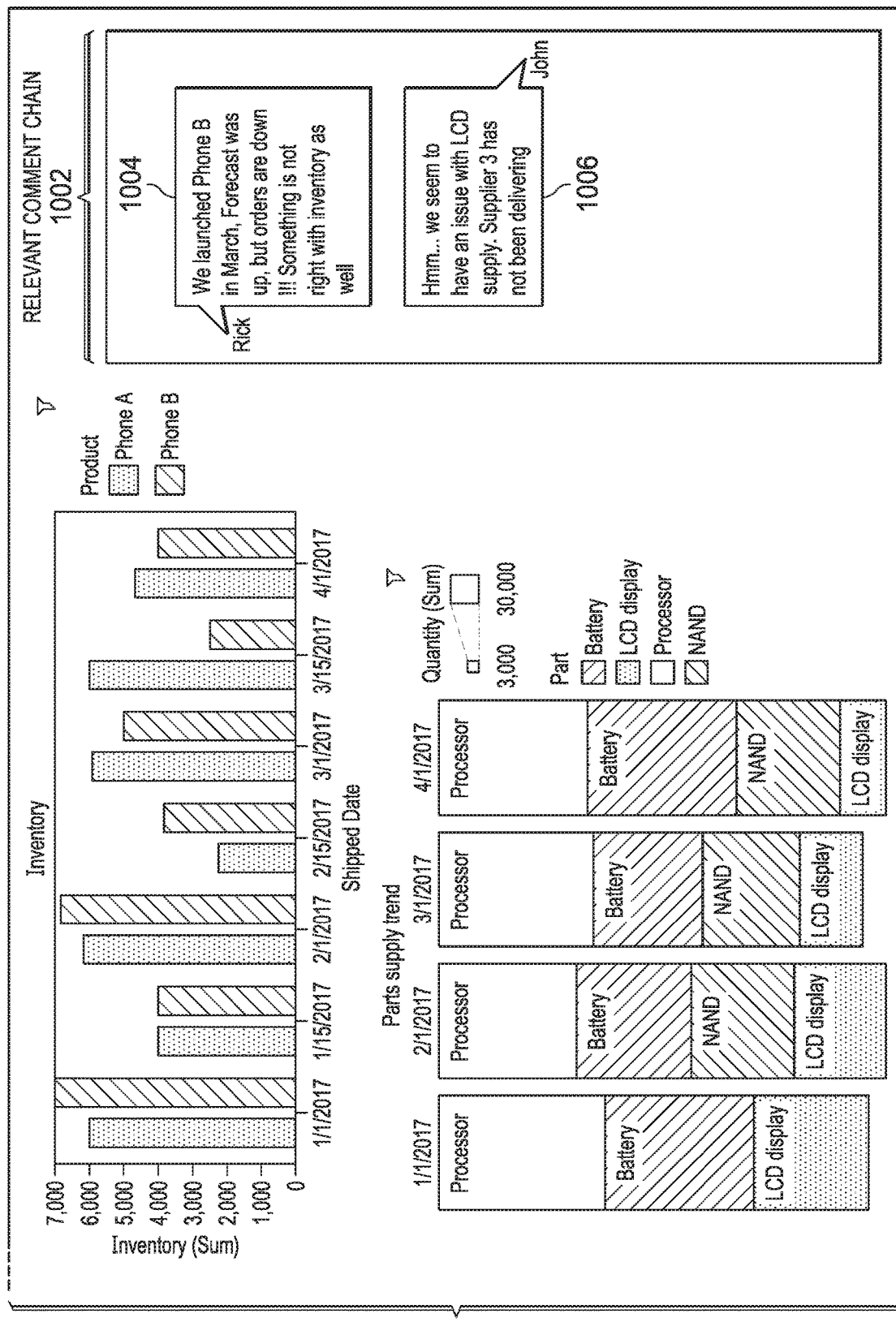

With reference now to FIGS. 10A-10B, a diagram illustrating an example of data visualizations with relevant comment chain is depicted in accordance with an illustrative embodiment. In this example, data visualizations 1000 include relevant comment chain 1002, which shows Rick's comment 1004 and John's comment 1006. Rick's comment 1004 and John's comment 1006 are the same as Rick's comment 906 and John's comment 912 in FIGS. 9A-9B. In other words, the business intelligence tool is only displaying those comments that are relevant to the current context of the discussion between Rick and John and not displaying other comments in the chain that are not relevant. The business intelligence tool generates relevant comment chain 1002 to prevent context switching.

Figure 11A:
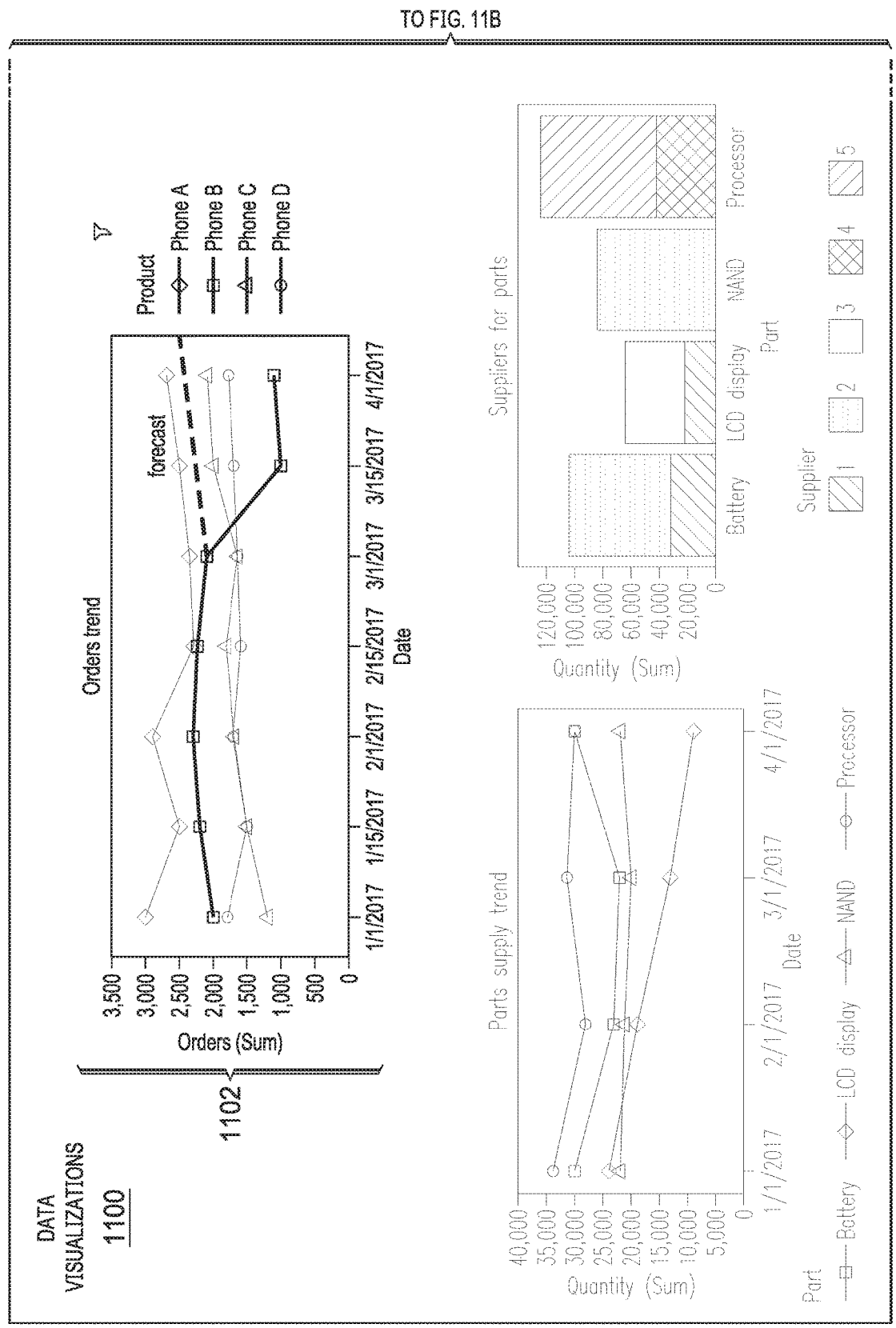
FIGS. 11A-11B are a diagram illustrating an example of selecting a comment in a relevant comment chain corresponding to data visualizations in accordance with an illustrative embodiment.
Figure 11B:
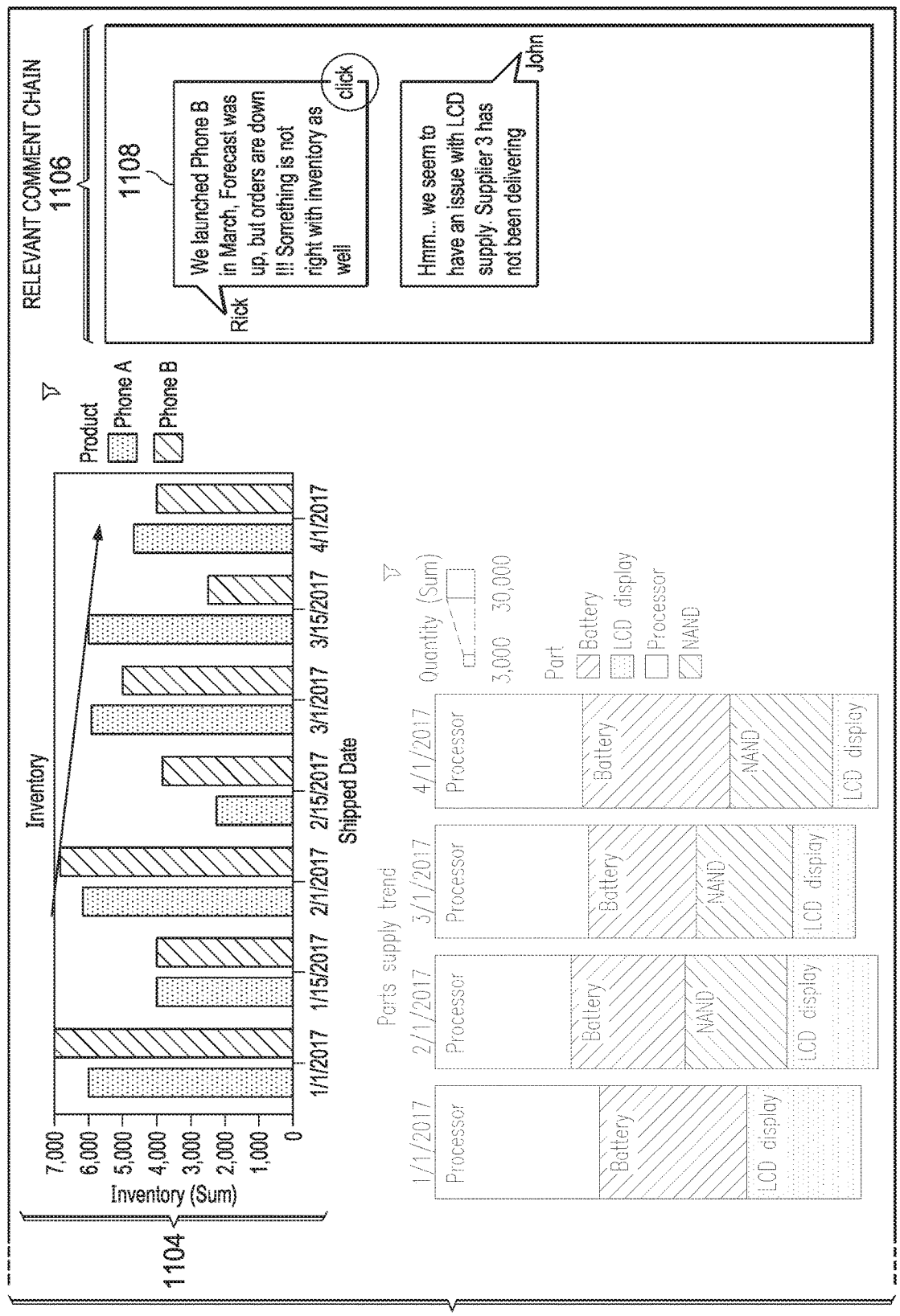

With reference now to FIGS. 11A-11B, a diagram illustrating an example of selecting a comment in a relevant comment chain corresponding to data visualizations is depicted in accordance with an illustrative embodiment. Data visualizations 1100 again emphasize orders trend data visualization 1102 and inventory data visualization 1104 similar to data visualizations 900 in FIGS. 9A-9B. Emphasized orders trend data visualization 1102 and inventory data visualization 1104 relate to relevant comment chain 1106. In this example, a user selects Rick's comment 1108 using a mouse click, for example. In response to selection of comment 1108, the business intelligence tool analyzes comment 1108 for context using, for example, text analysis, semantic analysis, and/or natural language processing.

Figure 12A:
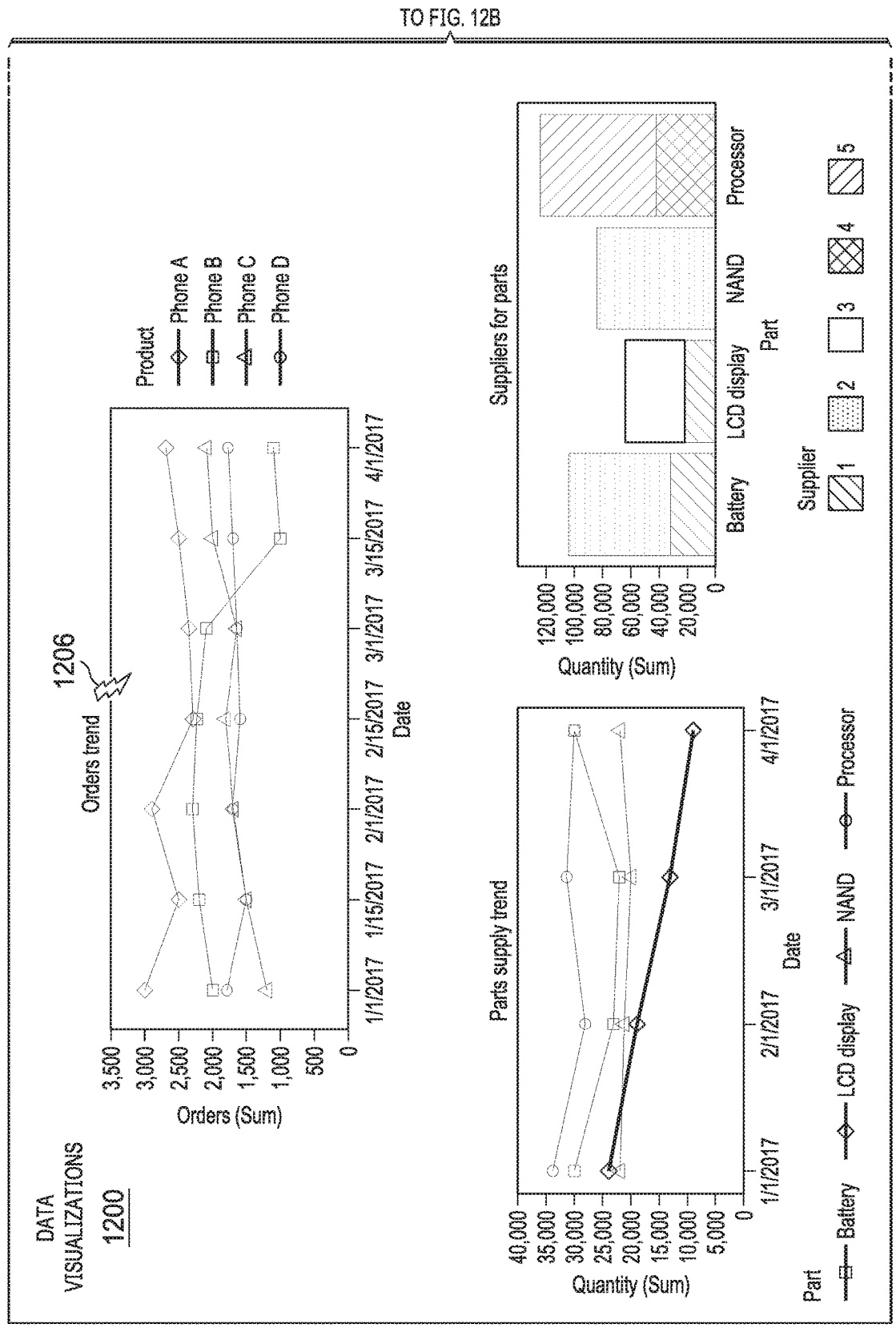
FIGS. 12A-12B are a diagram illustrating an example of inserting a graphic corresponding to a user comment in accordance with an illustrative embodiment.
Figure 12B:
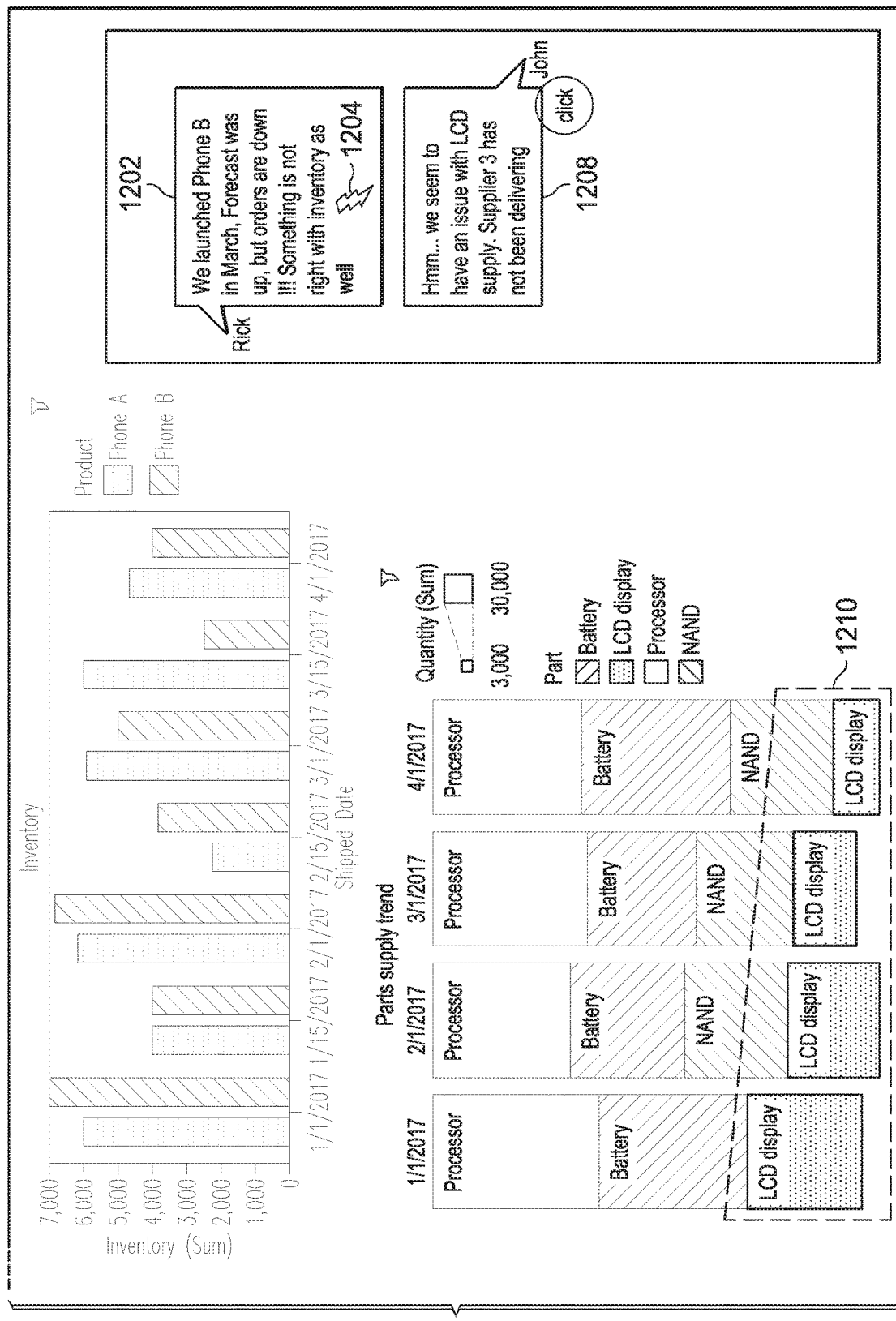

With reference now to FIGS. 12A-12B, a diagram illustrating an example of inserting a graphic corresponding to a user comment is depicted in accordance with an illustrative embodiment. In this example, data visualizations 1200 shows Rick's comment 1202 with graphic 1204. The business intelligence tool inserts graphic 1204 in comment 1202 in response to selection of Rick's comment 1108 in FIG. 11B. The business intelligence tool also inserts graphic 1206, which corresponds to graphic 1204, in the orders trend visualization related to comment 1202. Also in this example, a user selects John's comment 1208 using a mouse click, for example. In response to selection of comment 1208, the business intelligence tool emphasizes portion 1210 of the parts supply trend data visualization. Portion 1210 illustrates the LCD display parts supply issue related to selected comment 1208.

Figure 13A:
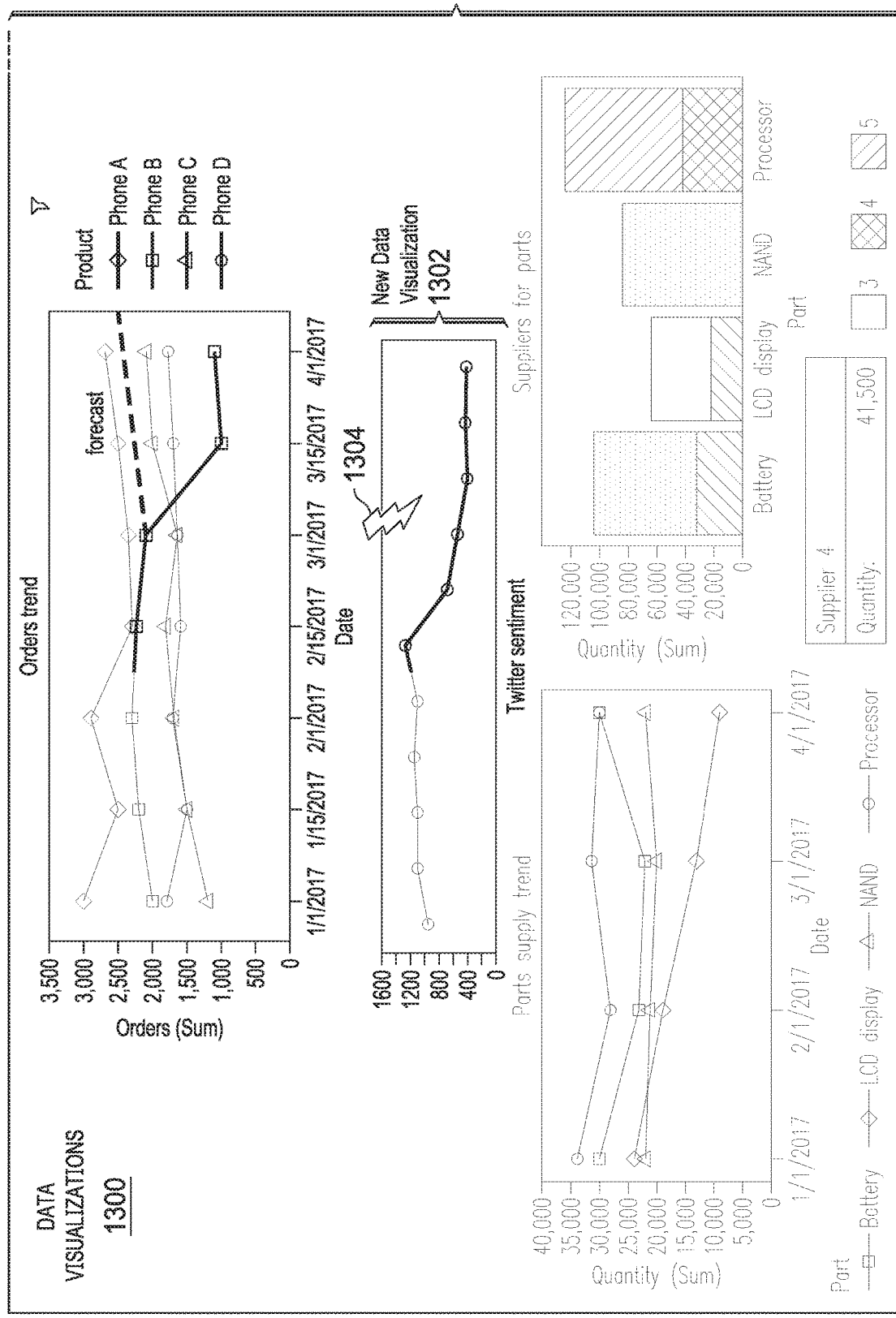
FIGS. 13A-13B are a diagram illustrating an example of adding a new data visualization corresponding to a user comment in accordance with an illustrative embodiment.
Figure 13B:
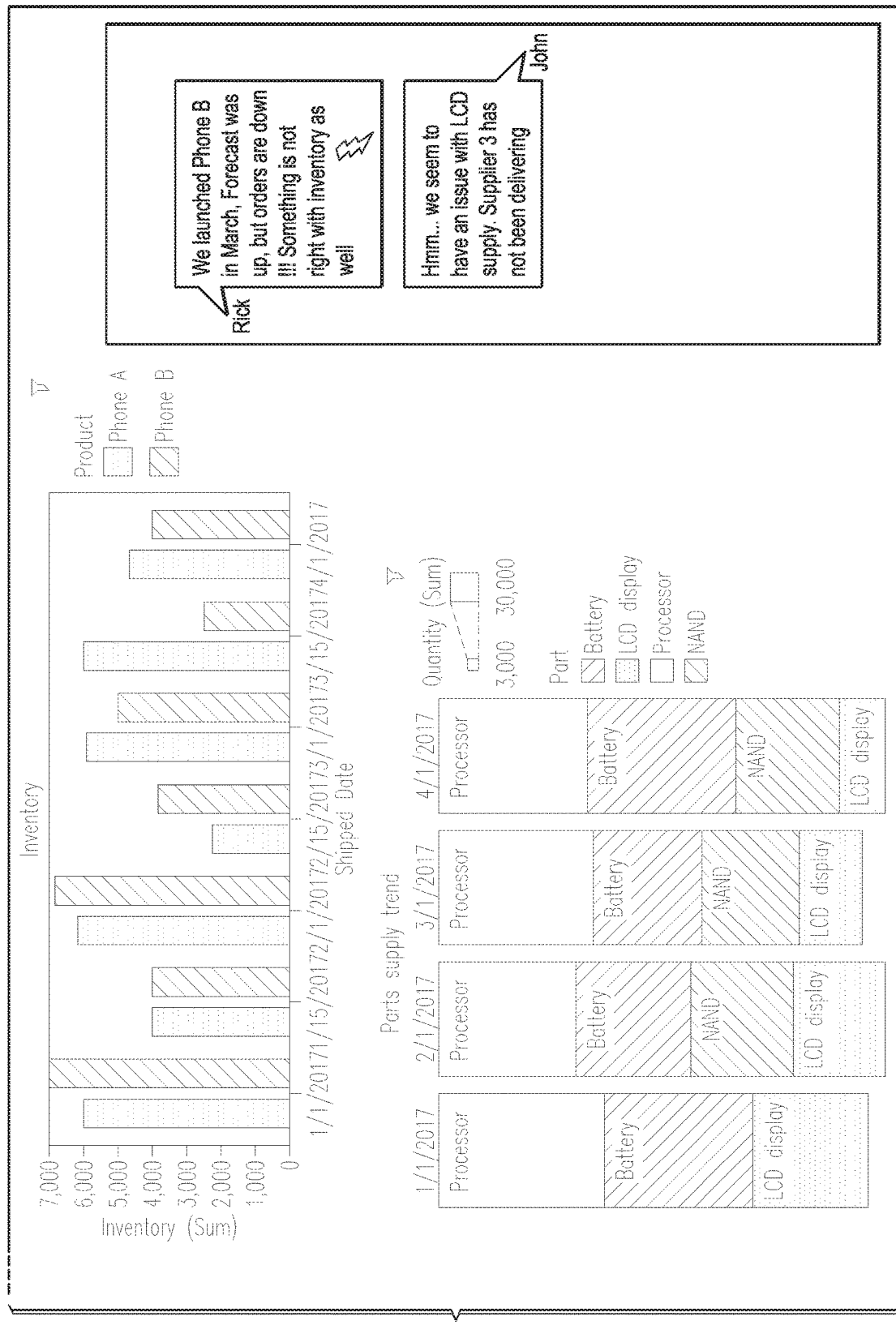

With reference now to FIGS. 13A-13B, a diagram illustrating an example of adding a new data visualization corresponding to a user comment is depicted in accordance with an illustrative embodiment. In this example, data visualizations 1300 shows new data visualization 1302, which also relates to the context of Rick's comment. The business intelligence tool adds new data visualization 1302 to show expressed social media sentiment regarding "Phone B," the topic of Rick's comment. Furthermore, the business intelligence tool inserts graphic 1304, which corresponds to the graphic in Rick's comment, into new data visualization 1302. Also, it should be noted that the business intelligence tool only temporarily displays new data visualization 1302 in data visualizations 1300.

Figure 14A:
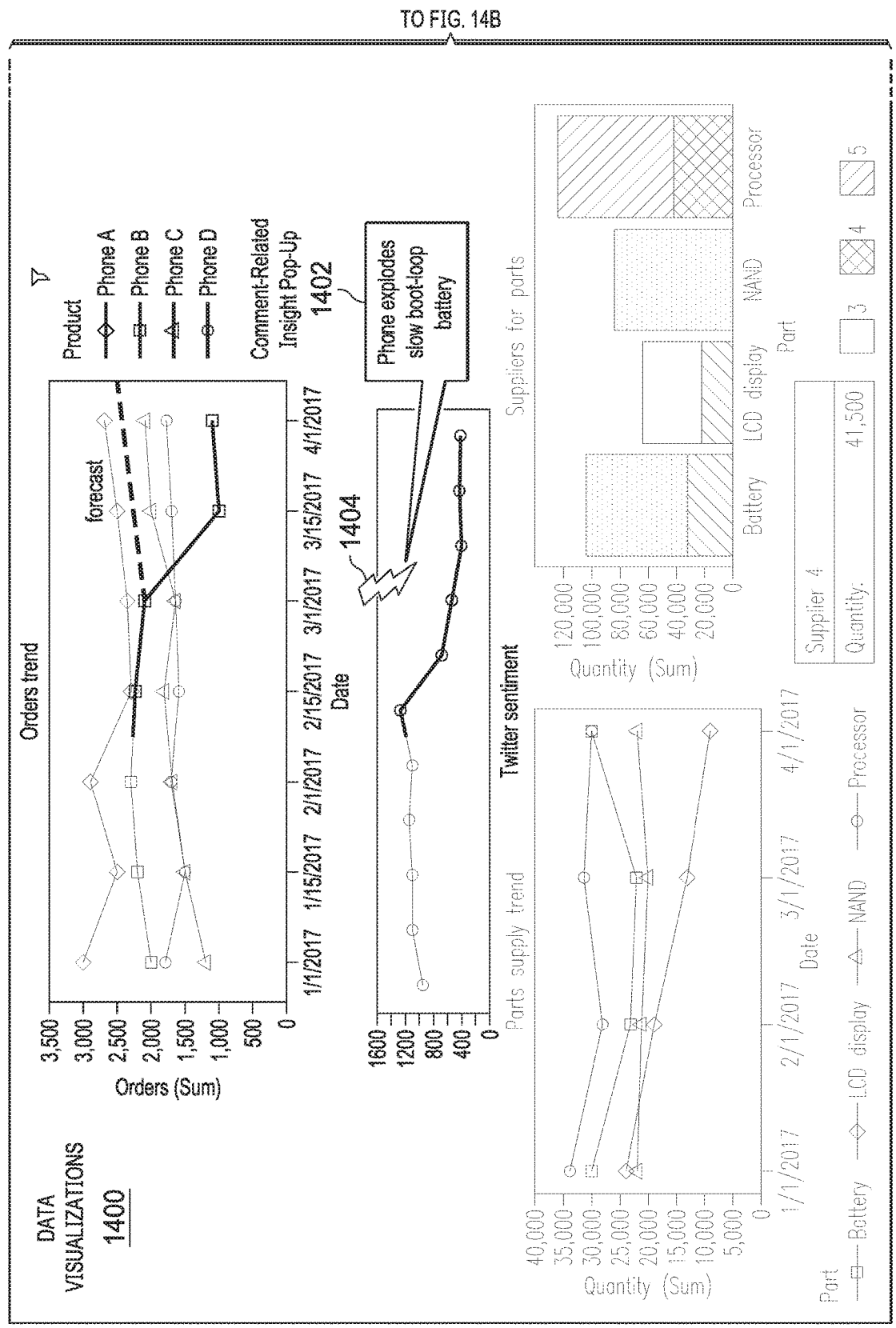
FIGS. 14A-14B are a diagram illustrating an example of displaying a comment-related insight pop-up corresponding to a selected graphic in accordance with an illustrative embodiment.
Figure 14B:
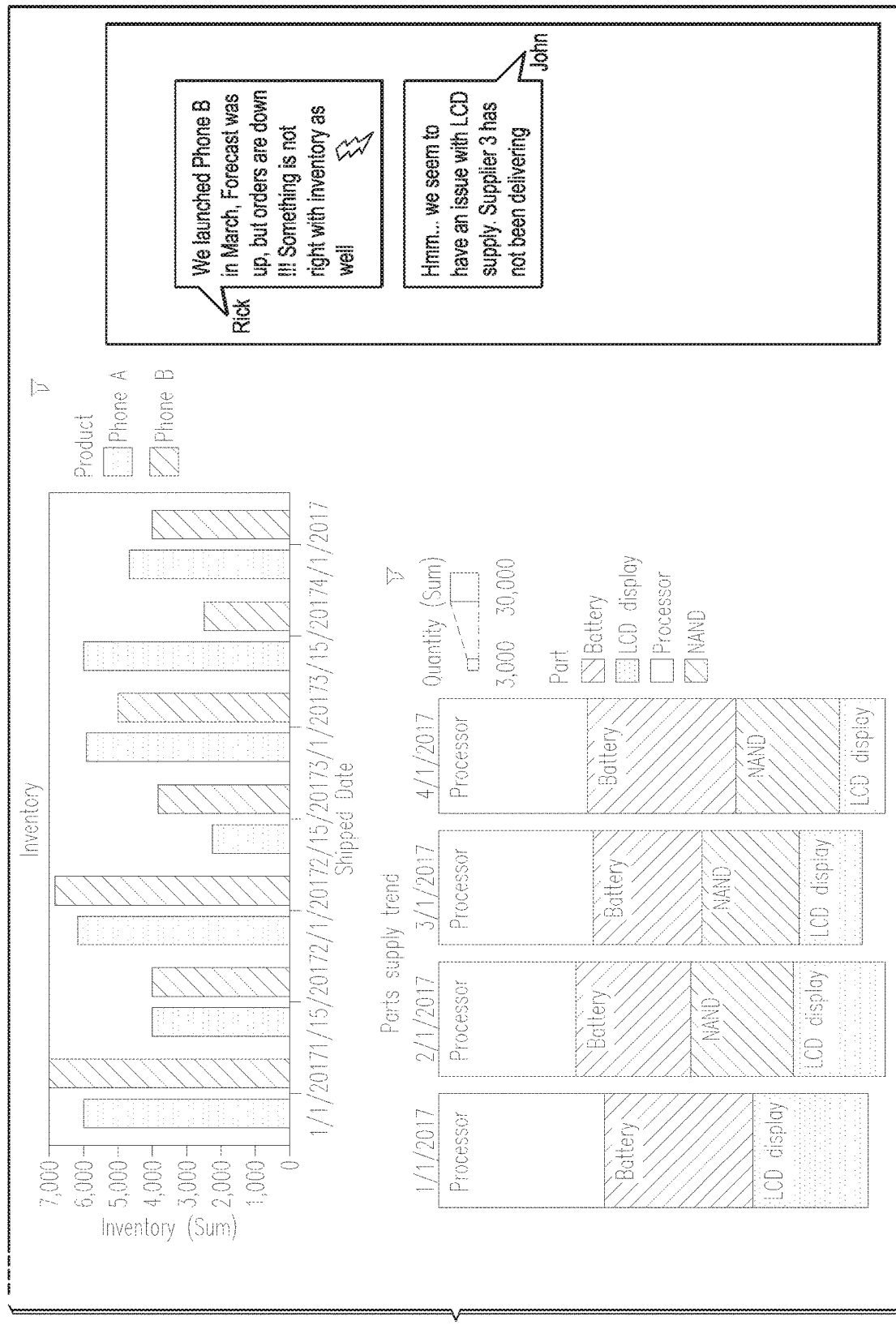

With reference now to FIGS. 14A-14B, a diagram illustrating an example of displaying a comment-related insight pop-up corresponding to a selected graphic is depicted in accordance with an illustrative embodiment. In this example, data visualizations 1400 shows comment-related insight pop-up 1402. Comment-related insight pop-up 1402 provides additional insight or information regarding Phone B based on information gained from social media posts. For example, comment-related insight pop-up 1402 indicates that Phone B explodes. The business intelligence tool generates and displays comment-related insight pop-up 1402 in response to selection of graphic 1404 by a user. Comment-related insight pop-up 1402 may be, for example, a word cloud.

Figure 15A:
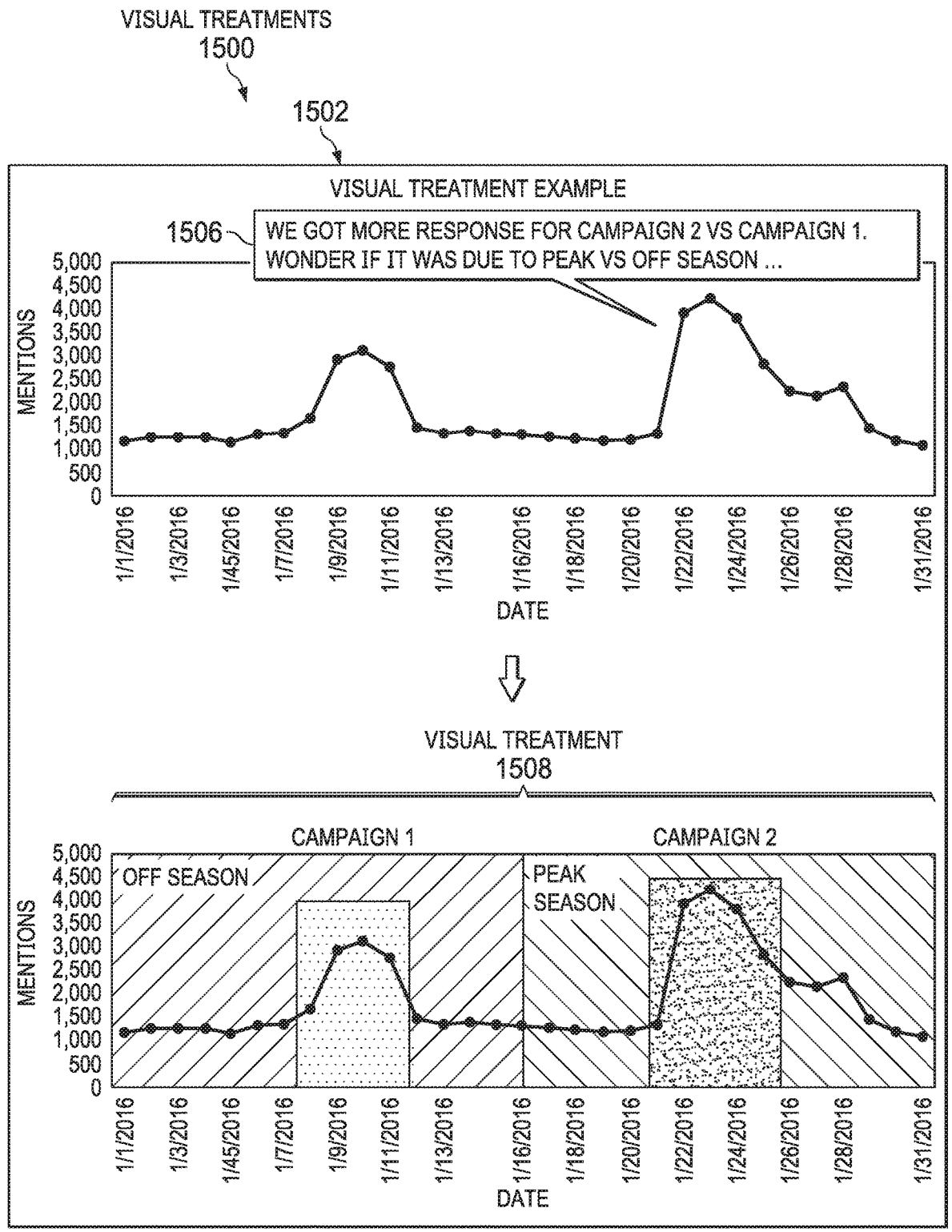

With reference now to FIGS. 15A-15B, diagrams illustrating examples of visual treatments are depicted in accordance with an illustrative embodiment. Visual treatments 1500 include visual treatment example 1502 and visual treatment example 1504. However, it should be noted that visual treatment example 1502 and visual treatment example 1504 only represent two possible types of visual treatments. In other words, illustrative embodiments may apply a multitude of different types of visual treatments to data visualizations.

Visual treatment example 1502 includes comment 1506, which indicates that "Campaign 2" received more response that "Campaign 1" and wondered if that was due to "peak season" versus "off season". In response to comment 1506, the business intelligence tool generates visual treatment 1508, which labels and delineates the off season and the peak season using different shading on the graph. Further, the business intelligence tool labels and delineates the start and finish of Campaign 1 and Campaign 2 using additional shading on the graph for easier review and evaluation by a user. In other words, the business intelligence tool highlights different areas of the graph for more efficient review.

Visual treatment example 1504 includes comment 1510, which indicates that sales targets need to be revised due to changing landscape. In response to comment 1510, the business intelligence tool generates visual treatment 1512, which adds revised sales targets in different shading to the chart for easier user review and analysis. In other words, the business intelligence tool in this example modifies the current chart by adding information.

Figure 16:
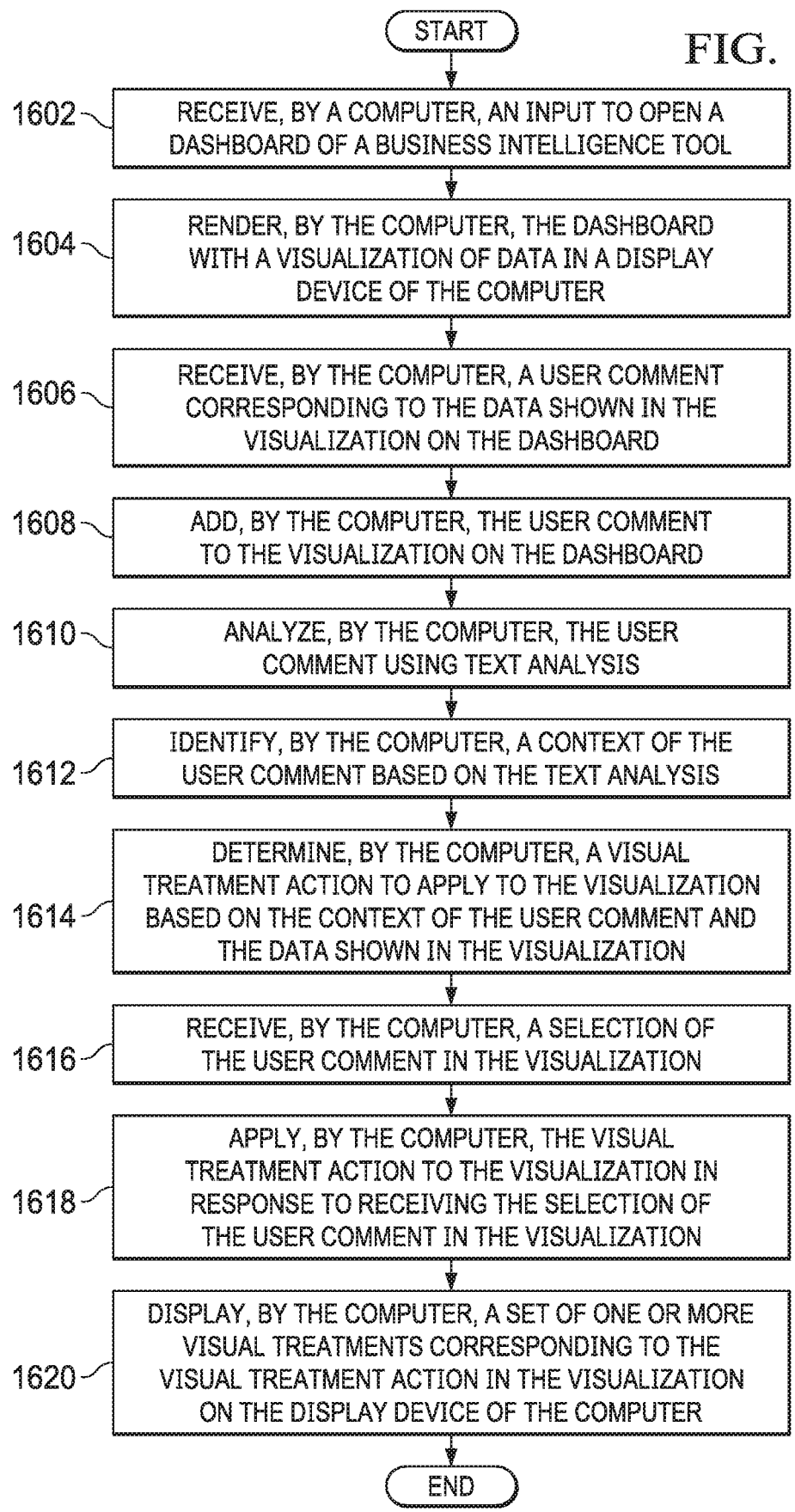
FIG. 16 is a flowchart illustrating a process for applying a visual treatment action to a data visualization in a business intelligence dashboard in accordance with an illustrative embodiment.

With reference now to FIG. 16, a flowchart illustrating a process for applying a visual treatment action to a data visualization in a business intelligence dashboard is shown in accordance with an illustrative embodiment. The process shown in FIG. 16 may be implemented in a computer, such as, for example, client 110 in FIG. 1 or data processing system 200 in FIG. 2.

The process begins when the computer receives an input to open a dashboard of a business intelligence tool (step 1602). In response, the computer renders the dashboard with a visualization of data in a display device of the computer (step 1604). Afterward, the computer receives a user comment corresponding to the data shown in the visualization on the dashboard (step 1606). The computer adds the user comment to the visualization on the dashboard (step 1608).

In addition, the computer analyzes the user comment (step 1610). The computer analyzes the text of the user comment using, for example, text analysis to determine a context of the user comment. The computer also may utilize semantic analysis and/or natural language processing to determine the context of the user comment. Subsequently, the computer identifies a context of the user comment based on the text analysis (step 1612).

Further, the computer determines a visual treatment action to apply to the visualization based on the context of the user comment and the data shown in the visualization (step 1614). Furthermore, the computer receives a selection of the user comment in the visualization (step 1616). The computer applies the visual treatment action to the visualization in response to receiving the selection of the user comment in the visualization (step 1618).

Afterward, the computer displays a set of one or more visual treatments corresponding to the visual treatment action in the visualization on the display device of the computer (step 1620). The set of visual treatments may include, for example, one or more of data highlighting, graphics, pop-ups or annotations that contains focus points, a new data visualization, modified data visualizations, additional insight information, and the like. The additional insight information may be, for example, a driving force corresponding to the focus points. The focus points are a set of one or more focus points that is related to and the subject of the user comment. Thereafter, the process terminates.

Thus, illustrative embodiments of the present invention provide a computer-implemented method, computer system, and computer program product for performing analysis of comments in a business intelligence dashboard to provide additional comment-related focus point insights into data of a dashboard visualization. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for applying visual treatments to business intelligence dashboards by a dashboard application of a business intelligence tool executing on a computer, the computer-implemented method comprising:
   analyzing, by a comment chain application of the business intelligence tool executing on the computer, a user comment in a dashboard of the business intelligence tool;
   identifying, by the comment chain application of the business intelligence tool executing on the computer, a context of the user comment, wherein the computer analyzes the user comment in the dashboard of the business intelligence tool using text analysis to determine the context of the user comment;
   sending, by the comment chain application of the business intelligence tool executing on the computer, the context to the dashboard application; and
   applying, by the dashboard application of the business intelligence tool executing on the computer, a visual treatment to a data visualization on the dashboard based on the context of the user comment;
   receiving, by the computer, the user comment that corresponds to data shown in the data visualization on the dashboard;
   adding, by the computer, the user comment to the data visualization on the dashboard, wherein the business intelligence tool receives a data query result containing the data from a database residing on a server computer, uses the dashboard application to generate the data visualization, and uses the comment chain application to receive and manage user comments regarding the data visualization; and
   determining, by the computer, (i) which part of the data within the data visualization the user comment pertains to and (ii) a plurality of visual treatments to apply to the part of the data within the data visualization based on the context of the user comment and the data shown in the data visualization.

2. The computer-implemented method of claim 1 further comprising:
   receiving, by the computer, a selection of the user comment in the data visualization; and
   responsive to the computer receiving the selection of the user comment in the data visualization, applying, by the computer, the plurality of visual treatments to the data visualization based on the context of the user comment and the data shown in the data visualization.

3. The computer-implemented method of claim 2 further comprising:
   displaying, by the computer, the plurality of visual treatments in the data visualization on a display device of the computer.

4. The computer-implemented method of claim 3, wherein the plurality of visual treatments includes a highlight and a graphic.

5. The computer-implemented method of claim 4, wherein a pop-up is displayed in response to a user selecting the graphic displayed in the data visualization, and wherein the pop-up contains additional information corresponding to the user comment.

6. The computer-implemented method of claim 5, wherein the additional information includes a driving force corresponding to a set of focus points corresponding to the user comment.

7. The computer-implemented method of claim 1, further comprising:
   providing comment-related insight into the data corresponding to the user comment based on the analysis of the user comment.

8. A computer system for applying visual treatments to business intelligence dashboards by a dashboard application of a business intelligence tool executing on the computer system, the computer system comprising:
   a bus system;
   a storage device connected to the bus system, wherein the storage device stores program instructions; and
   a processor connected to the bus system, wherein the processor executes the program instructions to:
      analyze, by a comment chain application of the business intelligence tool executing on the computer, a user comment in a dashboard of the business intelligence tool;
      identify a context of the user comment;
      sending the context to the dashboard application;
      apply, by the dashboard application executing on the computer, a visual treatment to a data visualization on the dashboard based on the context of the user comment;
      receive the user comment that corresponds to data shown in the data visualization on the dashboard;

add the user comment to the data visualization on the dashboard, wherein the business intelligence tool receives a data query result containing the data from a database residing on a server computer, uses the dashboard application to generate the data visualization and uses the comment chain application to receive and manage user comments regarding the data visualization; and determine (i) which part of the data within the data visualization the user comment pertains to and (ii) a plurality of visual treatments to apply to the part of the data within the data visualization based on the context of the user comment and the data shown in the data visualization.

9. The computer system of claim 8, wherein the processor further executes the program instructions to:

receive a selection of the user comment in the data visualization; and apply the plurality of visual treatments to the data visualization based on the context of the user comment and the data shown in the data visualization in response to receiving the selection of the user comment in the data visualization.

10. The computer system of claim 9, wherein the processor further executes the program instructions to:

display the plurality of visual treatments in the data visualization on a display device of the computer system.

11. A computer program product for applying visual treatments to business intelligence dashboards by a dashboard application of a business intelligence tool executing on a computer, the computer program product comprising a computer readable storage medium having program instructions embodied therewith, the program instructions executable by the computer to cause the computer to perform a method comprising:

analyzing, by a comment chain application of the business intelligence tool executing on the computer, a user comment in a dashboard of the business intelligence tool;

identifying, by the comment chain application of the business intelligence tool executing on the computer, a context of the user comment;

sending, by the comment chain application of the business intelligence tool executing on the computer, the context to the dashboard application;

applying, by the dashboard application of the business intelligence tool executing on the computer, a visual treatment to a data visualization on the dashboard based on the context of the user comment;

receiving, by the computer, the user comment that corresponds to data shown in the data visualization on the dashboard;

adding, by the computer, the user comment to the data visualization on the dashboard, wherein the business intelligence tool receives a data query result containing the data from a database residing on a server computer, uses the dashboard application to generate the data visualization and uses the comment chain application to receive and manage user comments regarding the data visualization; and determining, by the computer, (i) which part of the data within the data visualization the user comment pertains to and (ii) a plurality of visual treatments to apply to the part of the data within the data visualization based on the context of the user comment and the data shown in the data visualization.

12. The computer program product of claim 11 further comprising:

receiving, by the computer, a selection of the user comment in the data visualization; and responsive to the computer receiving the selection of the user comment in the data visualization, applying, by the computer, the plurality of visual treatments to the data visualization based on the context of the user comment and the data shown in the data visualization.

13. The computer program product of claim 12 further comprising:

displaying, by the computer, the plurality of visual treatments in the data visualization on a display device of the computer.

14. The computer program product of claim 13, wherein the plurality of visual treatments includes at least two of a highlight, a graphic, a pop-up, a new data visualization, and a modified data visualization.

* * * * *